United States Patent
Shimamura et al.

(10) Patent No.: US 9,684,988 B2
(45) Date of Patent: Jun. 20, 2017

(54) IMAGING DEVICE, IMAGE PROCESSING METHOD, AND RECORDING MEDIUM

(71) Applicant: OLYMPUS CORPORATION, Hachioji-shi, Tokyo (JP)

(72) Inventors: Shogo Shimamura, Tokyo (JP); Kensei Ito, Sagamihara (JP); Maki Toida, Tokyo (JP); Akira Tani, Sagamihara (JP); Manabu Ichikawa, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/824,456

(22) Filed: Aug. 12, 2015

(65) Prior Publication Data

US 2015/0348302 A1 Dec. 3, 2015

Related U.S. Application Data

(63) Continuation of application No. PCT/JP2014/052483, filed on Feb. 4, 2014.

(30) Foreign Application Priority Data

Mar. 12, 2013 (JP) .................................. 2013-049536

(51) Int. Cl.
*H04N 5/232* (2006.01)
*H04N 5/235* (2006.01)
(Continued)

(52) U.S. Cl.
CPC .......... *G06T 11/60* (2013.01); *H04N 1/00196* (2013.01); *H04N 5/2351* (2013.01);
(Continued)

(58) Field of Classification Search
CPC .......... H04N 1/00167; H04N 1/00161; H04N 1/387; H04N 1/00196; G06T 11/60
See application file for complete search history.

(56) References Cited

U.S. PATENT DOCUMENTS

2006/0204135 A1 9/2006 Funakura
2008/0007631 A1 1/2008 Abe
(Continued)

FOREIGN PATENT DOCUMENTS

JP 2004-153498 A 5/2004
JP 2004-215157 A 7/2004
(Continued)

OTHER PUBLICATIONS

Extended Search Report issued in corresponding European Patent Application No. 14765023.8 on Jun. 23, 2016, consisting of 12 pp.
(Continued)

*Primary Examiner* — Ahmed A Berhan
(74) *Attorney, Agent, or Firm* — Volpe and Koenig, P.C.

(57) ABSTRACT

An imaging device includes an imaging unit that images a subject so as to obtain first image data, an image processing unit that performs image processing on the first image data so as to obtain second image data, a first storage unit in which image data including one or both of the first image data and the second image data is stored, an image analysis unit that analyzes a feature of the image data stored in the first storage unit, a scenario generation unit that generates scenario data on the basis of an analysis result of the image analysis unit, a scenario changing unit that performs setting so as to change the scenario data, and an image collage processing unit that combines the plural pieces of image data stored in the first storage unit on the basis of the scenario data so as to generate the image collage data.

10 Claims, 24 Drawing Sheets

(51) Int. Cl.
    *H04N 5/77*    (2006.01)
    *H04N 5/907*    (2006.01)
    *H04N 9/804*    (2006.01)
    *H04N 1/00*    (2006.01)
    *G06T 11/60*    (2006.01)

(52) U.S. Cl.
    CPC ....... *H04N 5/2352* (2013.01); *H04N 5/23209* (2013.01); *H04N 5/23212* (2013.01); *H04N 5/23216* (2013.01); *H04N 5/23229* (2013.01); *H04N 5/772* (2013.01); *H04N 5/907* (2013.01); *H04N 9/8042* (2013.01); *G06T 2200/24* (2013.01)

(56) References Cited

U.S. PATENT DOCUMENTS

2008/0240563 A1    10/2008    Takano
2010/0220194 A1    9/2010    Ishiko
2011/0029914 A1    2/2011    Whitby
2011/0200273 A1*    8/2011    Singhal ................ G06K 9/3233
                                                            382/284
2012/0154608 A1    6/2012    Ko
2014/0078173 A1    3/2014    Takano

FOREIGN PATENT DOCUMENTS

JP     2006-287917 A    10/2006
JP     2008-278458 A    11/2008

OTHER PUBLICATIONS

International Search Report issued in corresponding International Patent Application No. PCT/JP2014/052483 on Mar. 11, 2014, consisting of 3 pp. (English translation provided).

* cited by examiner

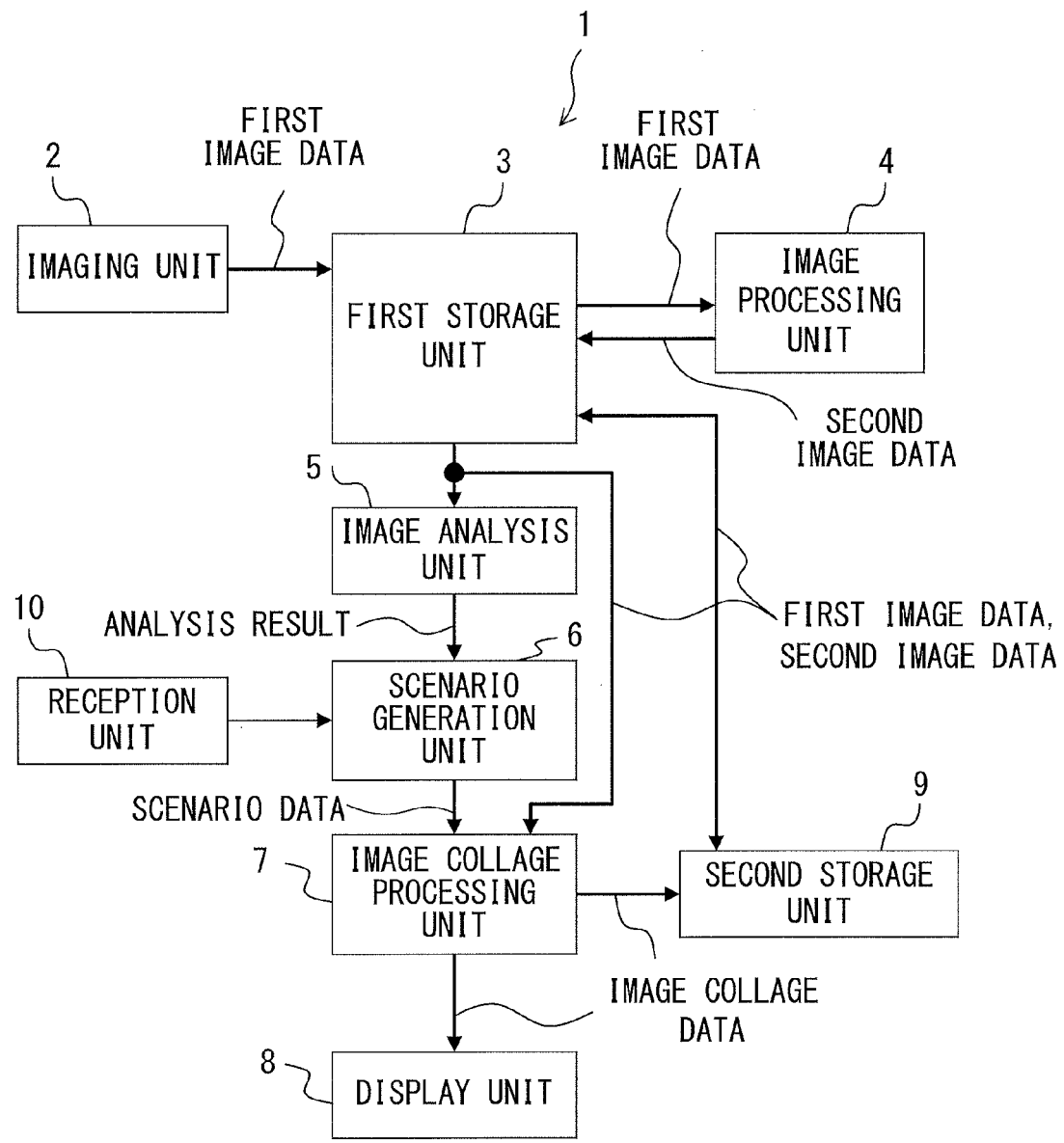
F I G. 1

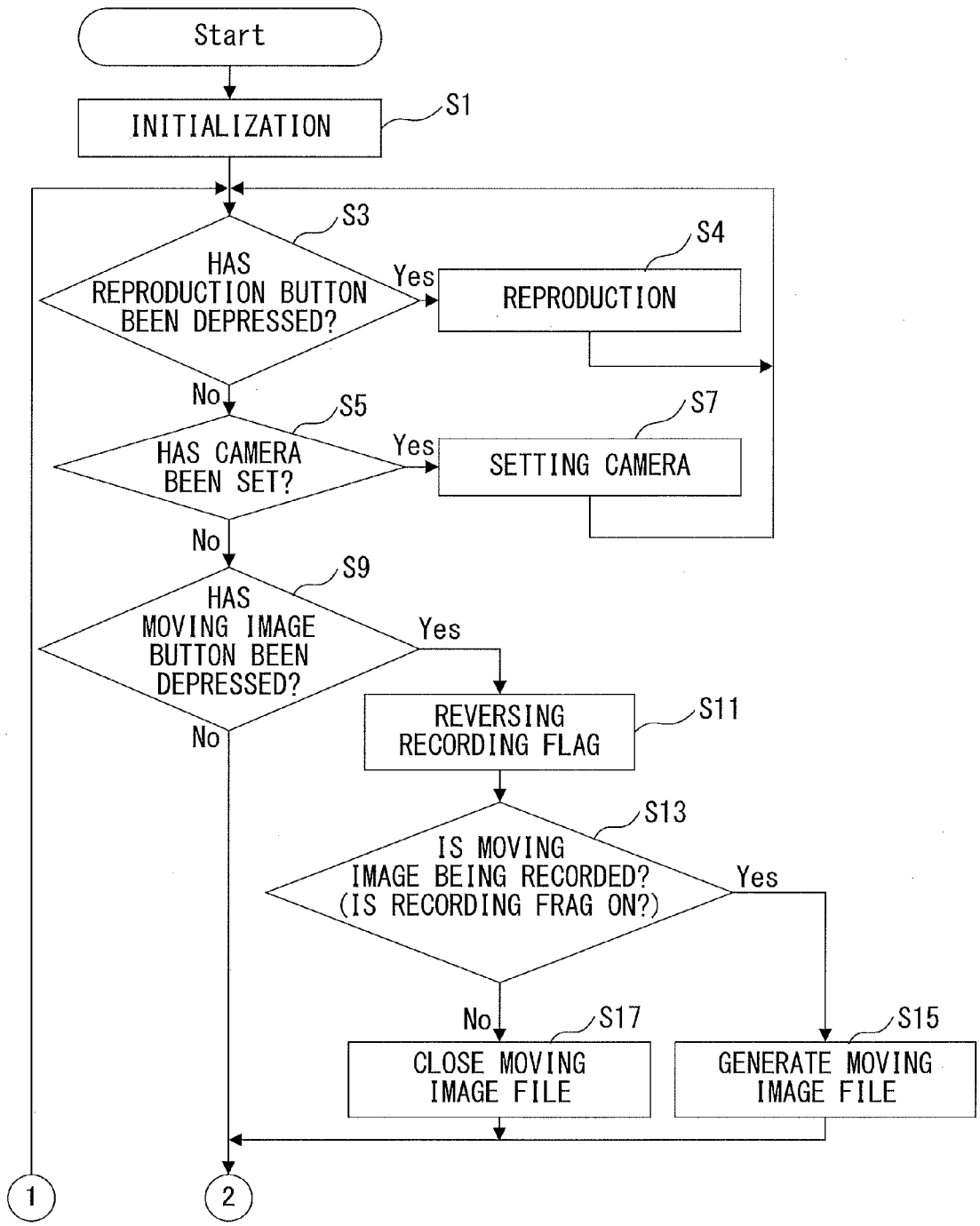
F I G. 3 A

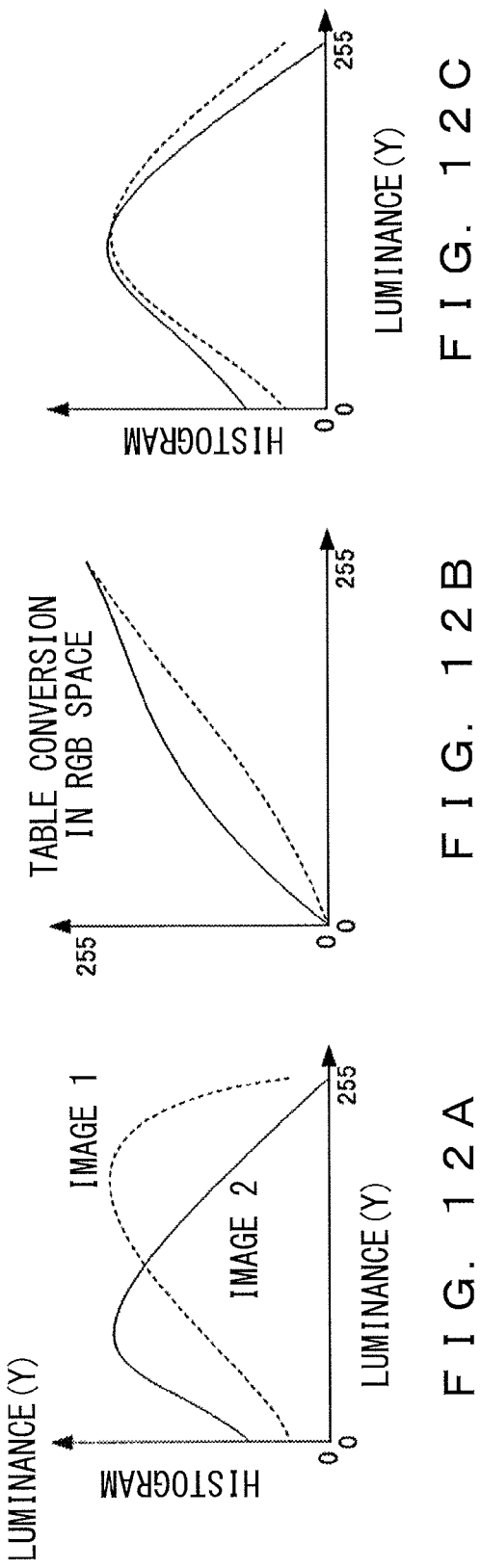

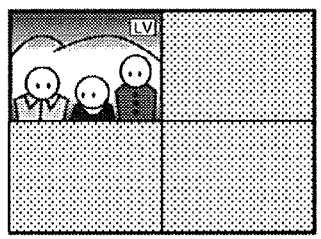 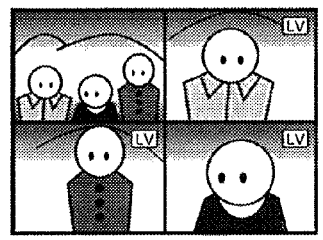 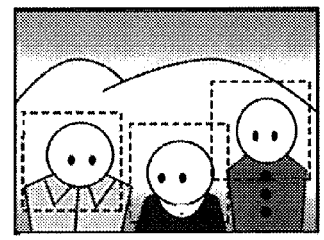
F I G. 1 4 A    F I G. 1 4 B    F I G. 1 4 C

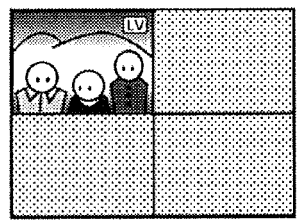
F I G. 1 6 A
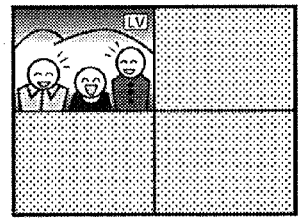
F I G. 1 6 B
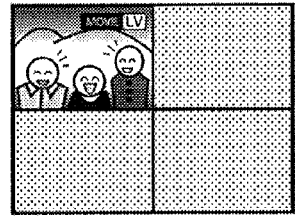
F I G. 1 6 C
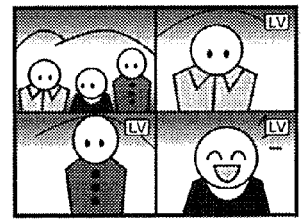
F I G. 1 6 D
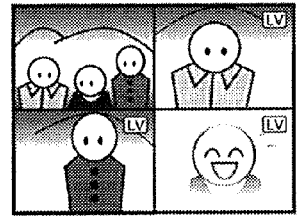
F I G. 1 6 E
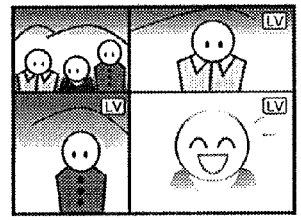
F I G. 1 6 F

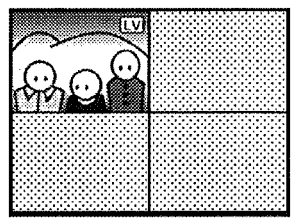
F I G. 1 8 A
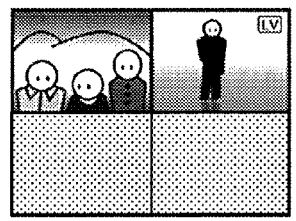
F I G. 1 8 B
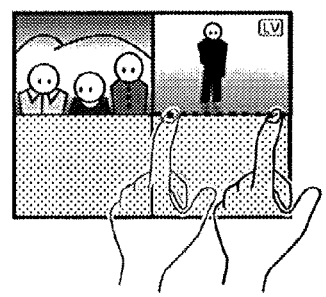
F I G. 1 8 C
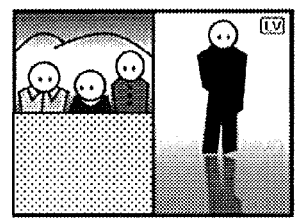
F I G. 1 8 D
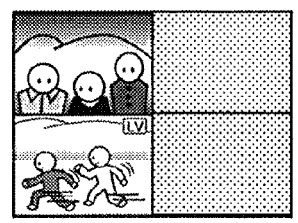
F I G. 1 8 E
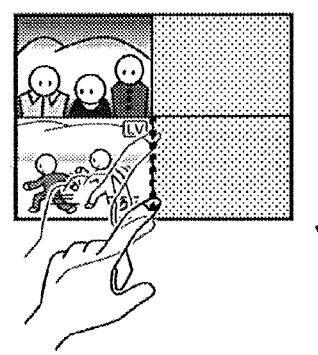
F I G. 1 8 F
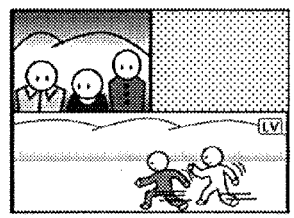
F I G. 1 8 G

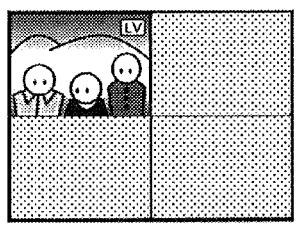 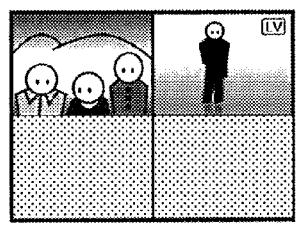 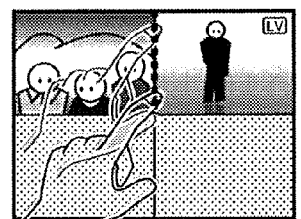
F I G. 2 0 A  F I G. 2 0 B  F I G. 2 0 C
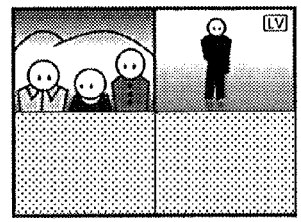
F I G. 2 0 D

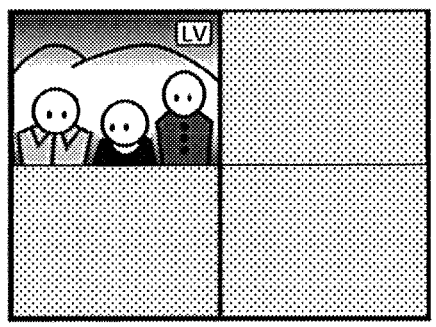
F I G. 2 2 A
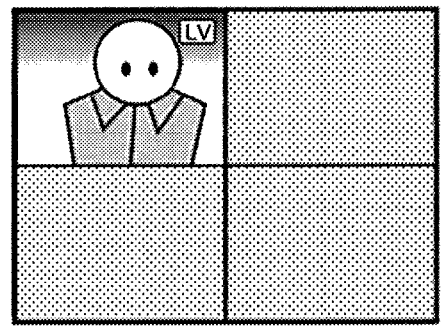
F I G. 2 2 B
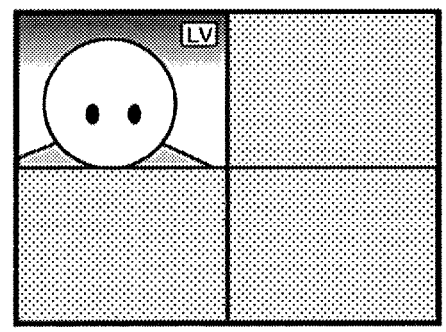
F I G. 2 2 C
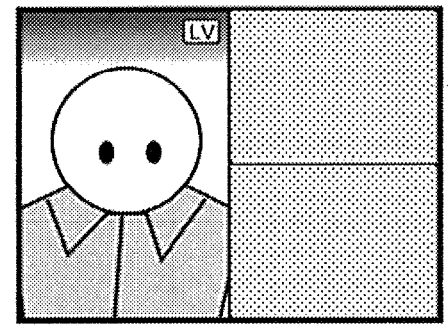
F I G. 2 2 D
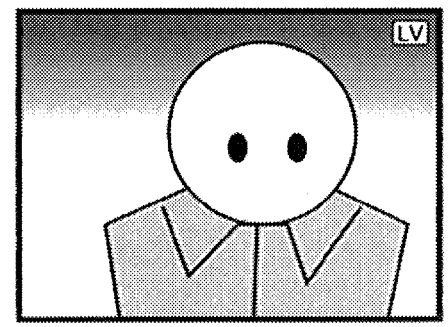
F I G. 2 2 E

IMAGING DEVICE, IMAGE PROCESSING METHOD, AND RECORDING MEDIUM

CROSS-REFERENCE TO RELATED APPLICATIONS

This application is based upon and claims the benefit of priority of the prior Japanese Patent Application No. 2013-049536, filed Mar. 12, 2013, the entire contents of which are incorporated herein by reference.

This is a Continuation Application of PCT Application No. PCT/JP2014/052483, filed Feb. 4, 2014, which was not published under PCT Article 21(2) in English.

FIELD

The present invention relates to an imaging device that lays out a plurality of images obtained by multiple-time photographing so as to generate image data of an image collage that forms a single image, an image processing method, and a recording medium.

BACKGROUND

Obtained images are stored or recorded as digital data in an imaging device such as a digital camera or a digital video camera, and therefore the obtained images can be easily processed.

One of the applications of an imaging device utilizing this feature is a photo collage. The photo collage is a composite photograph that is formed by laying out a plurality of photographs obtained by multiple-time photographing.

More specifically, a photo collage that is configured of a plurality of images is generated in order to represent feelings or imagination when photographing, by using images expressing a stereoscopic effect based on different scenes or different viewpoints, images photographed according to a passage of time, or photographed images having a motion of a subject. By using the image collage, feelings or imagination when photographing are attempted to be expressed to a viewer. In order to attain this object, the way or order to arrange photographs to be combined has a scenario, and the scenario is very important for evoking feelings in a viewer.

Therefore, as an example, a photographer who wishes to obtain a desired photo collage needs to consider in advance a scenario for the photo collage and to take photographs suitable for the scenario, when taking a plurality of photographs used for the photo collage.

As an example of an imaging device, an imaging device is known in which a series of photographing in a plurality of photographing patterns is performed easily and efficiently (see, for example, Patent Document 1 (Japanese Laid-open Patent Publication No. 2004-215157)). When performing a series of pattern photographing on a specific object to be photographed, this imaging device simultaneously displays a plurality of guide images that are samples of the series of pattern photographing on a rear display unit of the imaging device. Then, in order to perform one of the series of pattern photographing in accordance with a user's operation, the imaging device selects an arbitrary guide image from the plurality of guide images simultaneously displayed on the rear display unit, and displays the guide image on the rear display unit together with a live-view image so as to perform the one of the series of pattern photographing. By sequentially performing the photographing above, the imaging device performs the series of pattern photographing.

As described above, when taking a plurality of photographs used for a desired photo collage, a photographer needs to consider in advance a scenario for the photo collage and to take photographs suitable for the scenario.

It is preferable that an imaging device support generation of a photo collage, such as the conception of a scenario and photographs suitable for the scenario or the determination of a configuration of the photo collage.

SUMMARY

An aspect of the present invention provides an imaging device that combines plural pieces of image data so as to generate image collage data, the imaging device including an imaging unit that images a subject so as to obtain first image data, an image processing unit that performs image processing on the first image data so as to obtain second image data, a first storage unit in which image data including one or both of the first image data and the second image data is stored, an image analysis unit that analyzes a feature of the image data stored in the first storage unit, a scenario generation unit that generates scenario data on the basis of an analysis result of the image analysis unit, a scenario changing unit that performs setting so as to change the scenario data generated by the scenario generation unit, and an image collage processing unit that combines the plural pieces of image data stored in the first storage unit on the basis of the scenario data so as to generate the image collage data, after the scenario generation unit has generated the scenario data on the basis of the analysis result of the image analysis unit, the imaging device prioritizing the scenario data, when the scenario changing unit performs setting so as to change the scenario data, and updating the scenario data on the basis of the analysis result of the image analysis unit, in synchronization with a change in the image data stored in the first storage unit, when the scenario changing unit does not perform setting so as to change the scenario data.

Another aspect of the present invention provides an image processing method that includes imaging a subject so as to obtain first image data, storing the first image data in a first storage unit, performing image processing on the first image data so as to obtain second image data, storing the second image data in the first storage unit, analyzing a feature of image data stored in the first storage unit, generating scenario data on the basis of a result of the analyzing, after the scenario data has been generated on the basis of the result of the analyzing, when setting is performed so as to change the scenario data, prioritizing the scenario data, and when setting is not performed so as to change the scenario data, updating the scenario data on the basis of the result of the analyzing, in synchronization with a change in the image data stored in the first storage unit, and combining plural pieces of image data stored in the first storage unit on the basis of the scenario data so as to generate image collage data.

Yet another aspect of the present invention provides a non-transitory computer-readable recording medium storing an image processing program for causing a computer to execute a process that includes imaging a subject so as to obtain first image data, storing the first image data in a first storage unit, performing image processing on the first image data so as to obtain second image data, analyzing a feature of image data stored in the first storage unit, generating scenario data on the basis of a result of the analyzing, after the scenario data has been generated on the basis of the result of the analyzing, when setting is performed so as to change the scenario data, prioritizing the scenario data, and when setting is not performed so as to change the scenario data, updating the scenario data on the basis of the result of the analyzing, in synchronization with a change in the image data stored in the first storage unit, and combining plural pieces of image data stored in the first storage unit on the basis of the scenario data so as to generate image collage data.

BRIEF DESCRIPTION OF DRAWINGS

FIG. 1 illustrates an exemplary configuration of an imaging device according to the embodiment of the present invention.

FIG. 3A is a flowchart (Part 1) illustrating the entire processing of a camera according to the embodiment of the present invention.

FIG. 12A is the first diagram explaining luminance change processing performed by an image collage processing unit of a camera according to the embodiment of the present invention.

FIG. 12B is the second diagram explaining luminance change processing performed by an image collage processing unit of a camera according to the embodiment of the present invention.

FIG. 12C is the third diagram explaining luminance change processing performed by an image collage processing unit of a camera according to the embodiment of the present invention.

FIG. 14A is the first diagram explaining an image collage displayed on a display panel in accordance with a scenario set in a camera according to the embodiment of the present invention.

FIG. 14B is the second diagram explaining an image collage displayed on a display panel in accordance with a scenario set in a camera according to the embodiment of the present invention.

FIG. 14C is the third diagram explaining an image collage displayed on a display panel in accordance with a scenario set in a camera according to the embodiment of the present invention.

FIG. 16A is yet another first diagram explaining an image collage displayed on a display panel in accordance with a scenario set in a camera according to the embodiment of the present invention.

FIG. 16B is yet another second diagram explaining an image collage displayed on a display panel in accordance with a scenario set in a camera according to the embodiment of the present invention.

FIG. 16C is yet another third diagram explaining an image collage displayed on a display panel in accordance with a scenario set in a camera according to the embodiment of the present invention.

FIG. 16D is yet another fourth diagram explaining an image collage displayed on a display panel in accordance with a scenario set in a camera according to the embodiment of the present invention.

FIG. 16E is yet another fifth diagram explaining an image collage displayed on a display panel in accordance with a scenario set in a camera according to the embodiment of the present invention.

FIG. 16F is yet another sixth diagram explaining an image collage displayed on a display panel in accordance with a scenario set in a camera according to the embodiment of the present invention.

FIG. 18A is yet another first diagram explaining an image collage displayed on a display panel in accordance with a scenario set in a camera according to the embodiment of the present invention.

FIG. 18B is yet another second diagram explaining an image collage displayed on a display panel in accordance with a scenario set in a camera according to the embodiment of the present invention.

FIG. 18C is yet another third diagram explaining an image collage displayed on a display panel in accordance with a scenario set in a camera according to the embodiment of the present invention.

FIG. 18D is yet another fourth diagram explaining an image collage displayed on a display panel in accordance with a scenario set in a camera according to the embodiment of the present invention.

FIG. 18E is yet another fifth diagram explaining an image collage displayed on a display panel in accordance with a scenario set in a camera according to the embodiment of the present invention.

FIG. 18F is yet another sixth diagram explaining an image collage displayed on a display panel in accordance with a scenario set in a camera according to the embodiment of the present invention.

FIG. 18G is yet another seventh diagram explaining an image collage displayed on a display panel in accordance with a scenario set in a camera according to the embodiment of the present invention.

FIG. 20A is yet another first diagram explaining an image collage displayed on a display panel in accordance with a scenario set in a camera according to the embodiment of the present invention.

FIG. 20B is yet another second diagram explaining an image collage displayed on a display panel in accordance with a scenario set in a camera according to the embodiment of the present invention.

FIG. 20C is yet another third diagram explaining an image collage displayed on a display panel in accordance with a scenario set in a camera according to the embodiment of the present invention.

FIG. 20D is yet another fourth diagram explaining an image collage displayed on a display panel in accordance with a scenario set in a camera according to the embodiment of the present invention.

FIG. 22A is yet another first diagram explaining an image collage displayed on a display panel in accordance with a scenario set in a camera according to the embodiment of the present invention.

FIG. 22B is yet another second diagram explaining an image collage displayed on a display panel in accordance with a scenario set in a camera according to the embodiment of the present invention.

FIG. 22C is yet another third diagram explaining an image collage displayed on a display panel in accordance with a scenario set in a camera according to the embodiment of the present invention.

FIG. 22D is yet another fourth diagram explaining an image collage displayed on a display panel in accordance with a scenario set in a camera according to the embodiment of the present invention.

FIG. 22E is yet another fifth diagram explaining an image collage displayed on a display panel in accordance with a scenario set in a camera according to the embodiment of the present invention.

DESCRIPTION OF EMBODIMENTS

Figure 2:
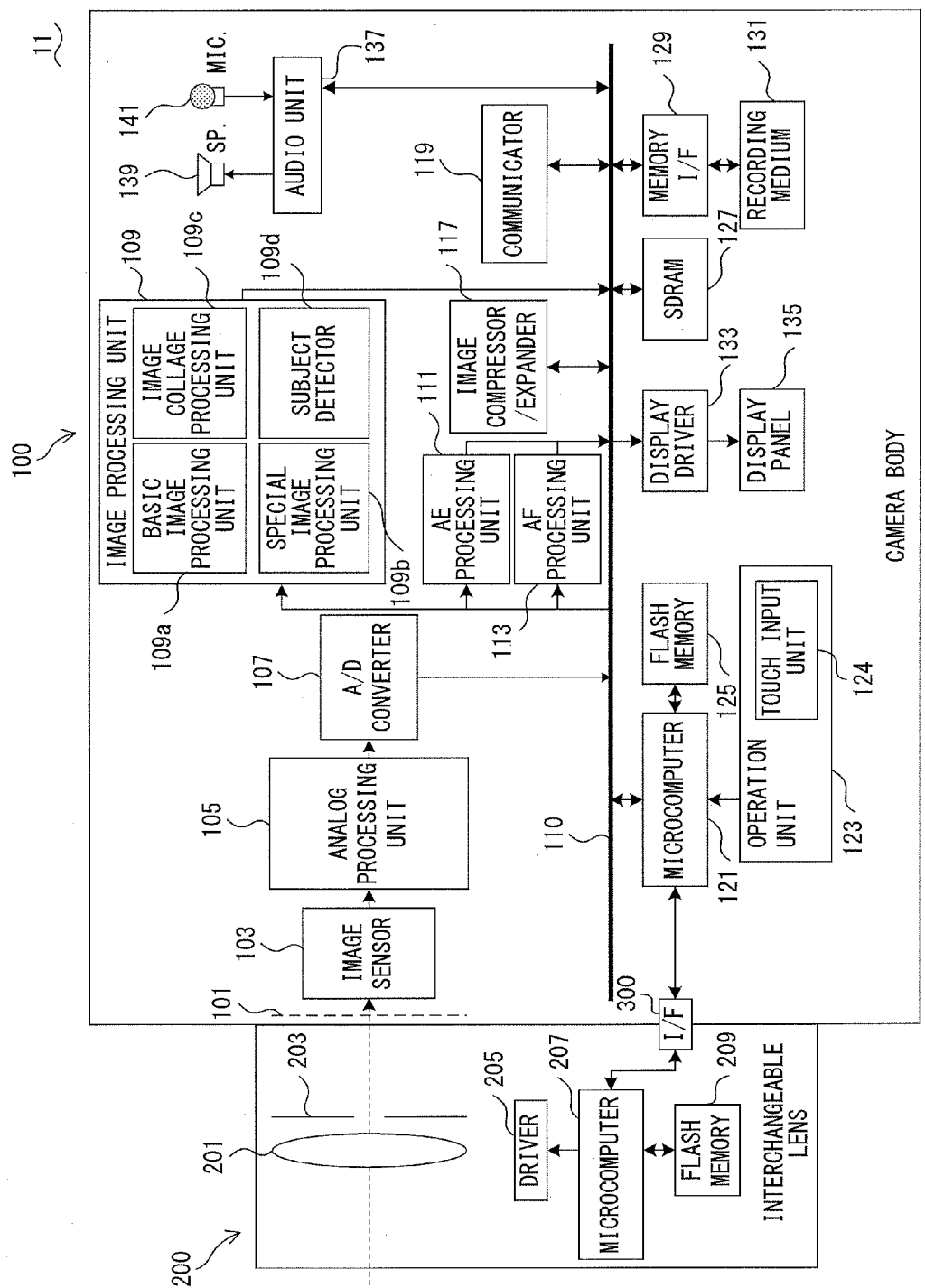
FIG. 2 is a block diagram illustrating the entire configuration primarily of an electrical system of a camera according to the embodiment of the present invention.

With reference to the drawings, embodiments of the present invention are described below. Herein, a live-view image is not an image that is obtained in reply to an explicit photographing instruction from a user of a camera (an example of an imaging device) by performing a release operation or the like, but is an image that is obtained by a live-view function of a camera as occasion demands.

FIG. 1 illustrates an exemplary configuration of an imaging device according to the embodiment.

An imaging device 1 illustrated in FIG. 1 has a function of combining plural pieces of image data so as to generate image collage data, and includes an imaging unit 2, a first storage unit 3, an image processing unit 4, an image analysis unit 5, a scenario generation unit 6, an image collage processing unit 7, a display unit 8, a second storage unit 9, and a reception unit 10, as illustrated in FIG. 1.

The imaging unit 2 images a subject, and obtains first image data. In the first storage unit 3, image data including one or both of the first image data and the second image data described later is stored. The image processing unit 4 performs image processing on the first image data, and obtains the second image data. The image analysis unit 5 analyzes a feature of image data stored in the first storage unit 3. The scenario generation unit 6 generates scenario data (hereinafter also simply referred to as a "scenario") on the basis of an analysis result of the image analysis unit 5. The image collage processing unit 7 combines plural pieces of image data stored in the first storage unit 3 on the basis of the scenario data so as to generate image collage data. The display unit 8 displays image data. In the second storage unit 9, the image data is stored. The reception unit 10 receives instructions.

In the imaging device 1 having the configuration above, the scenario data includes, for example, the number of divisions and a division form of an image collage, and arrangement information of images to be combined. The image data for which a feature is analyzed by the image analysis unit 5 is, for example, image data of a live-view image. The plural pieces of image data combined by the image collage processing unit 7 include, for example, pieces of image data of live-view images that are obtained by repeatedly and consecutively imaging a subject in the imaging unit 2.

The display unit 8 displays, for example, the image collage data generated by the image collage processing unit 7. In the second storage unit 9, the image collage data generated by the image collage processing unit 7 is stored for example. As an example, when the reception unit 10 receives a scenario change instruction, the scenario generation unit 6 generates scenario data on the basis of the scenario change instruction and the analysis result of the image analysis unit 5.

The image data stored in the second storage unit 9 is read out, and is stored in the first storage unit 3. In the second storage unit 9, the first image data, the second image data, and the like are also stored.

In the imaging device 1 having the configuration above, as an example, the following image processing method is performed. An image processing method is performed that includes imaging a subject so as to obtain first image data, storing the first image data in the first storage unit 3, performing image processing on the first image data so as to obtain second image data, storing the second image data in the first storage unit 3, analyzing a feature of image data stored in the first storage unit 3, generating scenario data on the basis of the analysis result, and combining plural pieces of image data stored in the first storage unit 3 on the basis of the scenario data so as to generate image collage data.

In a computer of the imaging device 1 having the configuration above, as an example, the following image processing program is executed.

An image processing program is executed for causing the computer to perform imaging of a subject so as to obtain first image data, storing the first image data in the first storage unit 3, performing image processing on the first image data so as to obtain second image data, storing the second image data in the first storage unit 3, analyzing a feature of image data stored in the first storage unit 3, generating scenario data on the basis of the analysis result, and combining plural pieces of image data stored in the first storage unit 3 on the basis of the scenario data so as to generate image collage data.

As described above, according to the embodiment, the imaging device 1, the image processing method performed by the imaging device 1, or the image processing program executed by the imaging device 1 enables a scenario to be generated on the basis of a feature of an image (such as a live-view image), and enables an image collage to be generated on the basis of the scenario so as to support the easy generation of a desired image collage for an arbitrary subject with a simple operation.

FIG. 2 is a block diagram illustrating the entire configuration primarily of an electrical system of a camera according to the embodiment. A camera 11 illustrated in FIG. 2 is an imaging device that stores or records obtained images as digital data. A user of the camera 11 can instruct obtainment of an image by performing a release operation using an operation unit 123, while observing a live-view image displayed on a display panel 135, which is a display unit. The camera 11 has a function of obtaining an image collage formed by laying out a plurality of still images (i.e., photographs) or moving images, in addition to a function of obtaining the still images and the moving images.

With reference to FIG. 2, a configuration of the camera 11 is described first. The camera 11 includes a camera body 100, and an interchangeable lens 200 that is detachable from the camera body 100 and that includes a photographic lens 201. In the embodiment, a configuration of a camera in which a photographic lens is interchangeable has been described as an example, but the photographic lens may be fixed to the camera body.

The interchangeable lens 200 includes the photographic lens 201, a diaphragm 203, a driver 205, a microcomputer 207, and a flash memory 209. The camera body 100 and the interchangeable lens 200 are connected via an interface (hereinafter referred to as an "I/F") 300.

The photographic lens 201 is configured of a single optical lens or a plurality of optical lenses that form a subject image, and is a single-focus lens or a zoom lens. The diaphragm 203 is arranged at the rear of the photographic lens 201 in an optical axis direction. The diaphragm 203 has a variable aperture, and controls a light quantity of a subject luminous flux that passes through the photographic lens 201. The photographic lens 201 can be moved in the optical axis direction by the driver 205. A focal position of the photographic lens 201 is controlled on the basis of a control signal from the microcomputer 207, and when the photographic lens 201 is a zoom lens, a focal distance of the photographic lens 201 is also controlled. The driver 205 also controls the aperture of the diaphragm 203.

The microcomputer 207, which is connected to the driver 205, is connected to the I/F 300 and the flash memory 209. The microcomputer 207 operates according to a program stored in the flash memory 209. The microcomputer 207 that has operated according to the program communicates with a microcomputer 121 in the camera body 100 described later, and controls the interchangeable lens 200 on the basis of a control signal from the microcomputer 121.

In the flash memory 209, various pieces of information such as an optical characteristic or an adjustment value of the interchangeable lens 200 are stored in addition to the program above. The I/F 300 is an interface for performing intercommunication between the microcomputer 207 in the interchangeable lens 200 and the microcomputer 121 in the camera body 100.

On the optical axis of the photographic lens 201 in the camera body 100, a mechanical shutter 101 is arranged. The mechanical shutter 101 controls an irradiation time of a subject luminous flux to the image sensor 103 described later by intercepting the subject luminous flux, and as an example, a known focal-plane shutter or the like can be employed for the mechanical shutter 101. At the rear of the mechanical shutter 101 and at a position at which a subject image is formed by the photographic lens 201, the image sensor 103 is arranged.

In the image sensor 103, photodiodes configuring respective pixels are arranged two-dimensionally in a matrix form. Each of the photodiodes generates a photoelectric conversion current according to a received light amount, and a charge of the photoelectric conversion current is stored by a capacitor connected to each of the photodiodes. On a front surface of the respective pixels, RGB filters of a Bayer array are arranged. A configuration of the image sensor 103 is not limited to a configuration including the RGB filters arranged in a Bayer array, and the image sensor 103 may have a configuration in which a plurality of sensors are arranged in a thickness direction of an element, such as FOVEON (a registered trademark of Foveon, Inc.).

The image sensor 103 is connected to an analog processing unit 105. The analog processing unit 105 performs waveform shaping on a photoelectric conversion signal (hereinafter referred to as an "analog image signal") that has been read from the image sensor 103, after reducing reset noise and the like, and increases gain so as to have appropriate luminance. The analog processing unit 105 is connected to an A/D converter 107. The A/D converter 107 performs analog-to-digital conversion on the analog image signal, outputs the obtained digital image signal (hereinafter referred to "image data") to a bus 110, and stores the obtained digital image signal in an SDRAM 127. Namely, in the camera 11, the image sensor 103, the analog processing unit 105, and the A/D converter 107 as a whole function as an imaging unit that images a subject and that obtains an image of the subject. Herein, raw image data on which image processing has not been performed by an image processing unit 109 is referred to as "RAW data".

The image sensor 103 incorporates an electronic shutter, and when images are repeatedly captured, such as in moving picture imaging or in live-view imaging, the image sensor 103 captures images by using the incorporated electronic shutter with the mechanical shutter 101 opened.

The bus 110 is a transfer path that transfers, within the camera body 100, various pieces of data read or generated within the camera body 100. To the bus 110, the image processing unit 109, an AE (Auto Exposure) processing unit 111, an AF (Auto Focus) processing unit 113, an image compressor/expander 117, a communicator 119, a microcomputer 121, an SDRAM (Synchronous DRAM) 127, a memory interface (hereinafter referred to as a "memory I/F") 129, a display driver 133, and an audio unit 137 in addition to the A/D converter 107 above are connected.

The image processing unit 109 includes a basic image processing unit 109a that performs basic image processing, a special image processing unit 109b that performs a special effect when a mode of applying a special effect such as an art filter is set, an image collage processing unit 109c that generates image data of an image collage, and a subject detector 109d that analyzes image data by performing pattern matching processing or the like so as to detect a subject. The image processing unit 109 reads image data that has been temporarily stored in the SDRAM 127, and performs image processing on the image data.

The basic image processing unit 109a performs, on RAW data, optical black (OB) subtraction processing, white balance (WB) correction, synchronization processing in the case of Bayer data, color reproduction processing, gamma correction processing, luminance change processing, edge emphasis processing, noise reduction (NR) processing and the like.

The special image processing unit 109b performs special image processing for imparting various visually special effects to image data processed by the basic image processing unit 109a, in accordance with the set special effect (art filter) or the like. As an example, when the Toy Photo mode has been set as one of the special effect (art filter) modes, the special image processing unit 109b performs a process of adding a shading effect on the image data.

When the Fantastic Focus mode, the Rough Monochrome mode, the Diorama mode, and the Crystal mode have been set as special effects (art filters), the special image processing unit 109b respectively performs soft focus processing, noise superimpose processing, blurring processing, and cross-filter processing on the image data.

The image collage processing unit 109c combines plural pieces of image data on the basis of a set image collage scenario, and generates image data of an image collage, which is an image formed by laying out a plurality of images that correspond to the plural pieces of image data in prescribed positions. The combined plural pieces of image data include one of raw image data (RAW data) before being processed by the image processing unit 109, image data after being processed by the basic image processing unit 109a, and image data after being processed by the basic image processing unit 109a and the special image processing unit 109b when a special effect has been set. However, the image collage processing unit 109c corrects respective images that are to configure an image collage before performing a process of combining plural pieces of image data. Specifically, the image collage processing unit 109c analyzes plural pieces of image data, and calculates a difference in color distribution, a difference in a luminance average, and the like between images. The image collage processing unit 109c then corrects color or luminance of the respective images that are to configure an image collage on the basis of the calculated information such that the image collage has an optimum state. Images that are more satisfactory for the image collage can be obtained by correcting images and performing adjustment processing between the images.

Hereinafter, image data processed only by the basic image processing unit 109a, or an image that corresponds to image data processed by the basic image processing unit 109a and the special image processing unit 109b is also referred to as a "frame image".

The subject detector 109d performs a process of detecting a prescribed subject, e.g., a human face or an animal such as a pet, by performing image analysis using a pattern matching technology or the like. The subject detector 109d may further perform a process of calculating a type, a size, a position, a distinctive color scheme, or the like of the detected subject. The detection results can be used, for example, for switching of photographing modes, autofocus, auto-zooming by which a subject is imaged so as to have a fixed size, the generation of a scenario for an image collage, the extraction or retrieval of images having a similar color scheme or tone (a color tone, lightness, shade, or a balance in the chroma direction), or the like.

The AE processing unit 111 measures subject luminance on the basis of image data input via the bus 110, and outputs information about the measured subject luminance to the microcomputer 121 via the bus 110.

A configuration in which the AE processing unit 111 calculates subject luminance on the basis of image data has been adopted, but the camera 11 may realize a similar function by providing the camera 11 with a photometric sensor dedicated to the measurement of subject luminance.

The AF processing unit 113 extracts a signal of a high-frequency component from image data, and obtains a focusing evaluated value by performing integration processing. The AF processing unit 113 outputs the obtained focusing evaluated value to the microcomputer 121 via the bus 110. Namely, the camera 11 performs focusing of the photographic lens 201 with a so-called contrast method.

When the image compressor/expander 117 records image data in a recording medium 131 connected to the memory I/F 129, the image compressor/expander 117 compresses image data read from the SDRAM 127 in accordance with various compression formats such as the JPEG compression format in the case of still images or the MPEG compression format in the case of moving images.

The microcomputer 121 adds a header needed to configure a JPEG file, an MPO file, or an MPEG file to JPEG image data or MPEG image data, and generates the JPEG file, the MPO file, or the MPEG file.

The microcomputer 121 records the generated file in the recording medium 131 via the memory I/F 129.

The image compressor/expander 117 also expands JPEG image data or MPEG image data in order to reproduce and display an image. In expanding the image data, a file recorded in the recording medium 131 is read out, expansion processing is performed on the file by the image compressor/expander 117, and the expanded image data is temporarily stored in the SDRAM 127.

In the embodiment, an example in which the JPEG compression format or the MPEG compression format is employed for an image compression format has been described; however, a compression format is not limited to these compression formats, and may be another compression format such as TIFF or H.264.

The communicator 119 communicates with external equipment in order to update or add a template stored in the flash memory 125 described later. The communicator 119 may be connected to the external equipment via a wired LAN or a wireless LAN, or may be connected to the external equipment via a USB cable or the like.

The microcomputer 121 functions as a control unit of the entirety of the camera 11, and generally controls various sequences of the camera. As an example, a scenario for an image collage is generated, changed, or the like under the control of the microcomputer 121. The operation unit 123 and the flash memory 125 in addition to the I/F 300 described above are connected to the microcomputer 121.

The operation unit 123 includes operation members such as various input buttons, various input keys or the like, e.g., a power button, a release button, a moving image button, a reproduction button, a menu button, a cross button, an OK button, or a mode dial, and the operation unit 123 detects operation states of these operation members and outputs the detection results to the microcomputer 121. The microcomputer 121 executes various sequences according to a user's operation on the basis of the detection results of the operation members from the operation unit 123. Namely, in the camera 11, the operation unit 123 functions as a reception unit that receives various instructions (for example, a photographing instruction, a scenario change instruction, or a reproduction instruction) from a user.

The power button is an operation member that instructs an ON/OFF operation of a power of the camera 11. When the power button is depressed, the camera 11 is turned on, and when the power button is depressed again, the camera 11 is turned off.

The release button is connected to a first release switch that is turned on when being depressed halfway, and to a second release switch that is turned on when being further depressed from a half-depressed state to a fully depressed state. When the first release switch is turned on, the microcomputer 121 executes a photographing preparation sequence such as an AE operation or an AF operation. When the second release switch is turned on, the microcomputer 121 controls the mechanical shutter 101 or the like, obtains image data based on a subject image from the image sensor 103 or the like, and executes a series of photographing sequences for recording the image data in the recording medium 131 so as to perform photographing.

The reproduction button is an operation button for setting and releasing a reproduction mode, and when the reproduction mode is set, image data of a photographed image is read from the recording medium 131, and the image is reproduced and displayed on the display panel 135.

The menu button is an operation button for displaying a menu screen on the display panel 135. Various camera settings can be performed on the menu screen. Examples of the camera setting include setting of a special effect (art filter). As the special effect, various special effects such as Fantastic Focus, Pop Art, Toy Photo, Rough Monochrome, or Diorama can be set. In addition, setting of an image collage can be performed on the menu screen. Examples of the setting of an image collage include setting of a scenario for an image collage. In the setting of a scenario for an image collage, the number of divisions and a division form of an image collage, arrangement of images to be combined and the like can be set. By setting a photographic scene in accordance with an event such as travel or an athletic meet, a scenario (for example, the number of divisions and a division form of an image collage, or arrangement of images to be combined) that is suitable for the photographic scene can be automatically set.

Further, by specifying one of a plurality of templates, a scenario according to the template can be automatically set. The respective templates specify the number of divisions and a division form of an image collage, arrangement of images to be combined, and the like. In the setting of a scenario for an image collage, it can be set whether a scenario set by a user is prioritized.

In this setting, when the setting of prioritizing a scenario set by a user is performed, in principle, the scenario is not changed, and a photo collage is generated in accordance with the scenario. When the setting of prioritizing a scenario set by a user is not performed, the scenario can be changed to an optimum scenario recommended by the camera 11 in accordance with an analysis result of an image (for example, a live-view image). However, in both of the cases, the scenario set by a user can be changed to a scenario according to the user's intention by issuing a scenario change instruction by the user, which is described later in detail. When setting of a scenario for an image collage has not been performed, an optimum scenario recommended by the camera 11 is automatically set in accordance with an analysis result of an image (for example, a live-view image).

The mode dial is a dial for selecting a photographing mode. In the camera 11, operation modes are switched between a normal mode for performing normal photographing and an image collage mode for photographing an image collage by operating the mode dial. The switching of the normal mode and the image collage mode may be performed on the menu screen or the like.

The operation unit 123 further includes a touch input unit 124. The touch input unit 124 is, for example, a touch panel sensor that is arranged so as to be superimposed on the display panel 135. The touch input unit 124 detects a touch operation that a user performs on the display panel 135, and outputs a detection result to the microcomputer 121. The microcomputer 121 executes various sequences according to the user's operation on the basis of the detection result of the touch input unit 124 of the operation unit 123.

The operation unit 123 may include the various buttons described above on the display panel 135. Namely, buttons may be displayed on the display panel 135, instead of physically providing the buttons on the surface of the camera 11, and the touch input unit 124 may detect an operation on the buttons displayed on the display panel 135.

The display panel 135 may function as the release button instead of displaying the release button on the display panel 135. In this case, a time at which the display panel 135 is touched may be regarded as a state in which the release button is depressed halfway, and a time at which the display panel 135 continues to be touched during a prescribed time period (for example, one second) or more may be regarded as a state in which the release button is fully depressed. Alternatively, a time at which the display panel 135 is touched may be regarded as a state in which the release button is depressed halfway and a state in which the release button is fully depressed.

The flash memory 125 is a non-volatile storage medium in which a program for executing various sequences of the microcomputer 121 is stored. The microcomputer 121 controls the entirety of a camera on the basis of the program stored in the flash memory 125. The flash memory 125 stores various adjustment values such as a color matrix coefficient, an R gain and a B gain that correspond to a white balance mode, a gamma table, or an exposure condition determination table. The flash memory 125 further stores, as a template, a scenario for an image collage, namely, information relating to how to lay out images to configure the image collage (information relating to the number of divisions and a division form of an image collage, arrangement of images to be combined, and the like), and the like, and also stores the scenario for an image collage in association with a photographic scene (such as travel or an athletic meet). A storage medium that stores the above program or adjustment values is not limited to a flash memory, and may be another non-volatile storage medium.

The SDRAM 127 is an electrically rewritable volatile memory that temporarily stores image data or the like. The SDRAM 127 temporarily stores image data output from the A/D converter 107 or image data processed by the image processing unit 109, the image compressor/expander 117, or the like.

The memory I/F 129 is connected to the recording medium 131. The memory I/F 129 performs control so as to write and read image data or data such as a header attached to the image data from and to the recording medium 131. The recording medium 131 is a recording medium such as a memory card detachable from the camera body 100, but the recording medium 131 is not limited to this, and may be a non-volatile memory, a hard disk, or the like incorporated into the camera body 100.

The display driver 133 is connected to the display panel 135. The display driver 133 displays an image on the display panel 135 on the basis of image data that is read from the SDRAM 127 or the recording medium 131 and that is expanded by the image compressor/expander 117. The display panel 135 is a liquid crystal display (LCD) provided on a rear surface of the camera body 100, and performs image display. The image display includes a Rec View display by which image data to be recorded is displayed for a short time immediately after photographing, reproduction display of an image file of a still image or a moving image recorded in the recording medium 131, and a moving image display such as live-view display. The display panel 135 may be an organic EL in addition to the LCD, or another display panel may be employed for the display panel 135. When a photographing mode is an image collage mode, a plurality of regions that each display an image (hereinafter referred to as "display regions") are defined on the display panel 135. Layout of the plurality of display regions is defined by a scenario for an image collage.

The audio unit 137 is connected to an SP (speaker) 139 and a MIC (microphone) 141. The audio unit 137 converts voice information, which is input digital data, into an analog signal, and causes sound to emit from the SP 139. The audio unit 137 converts a voice detected by the MIC 141 into digital data, and outputs the digital data to the bus 110 as voice information. The audio unit 137 transmits and receives digital data to/from the microcomputer 121 via the bus 110. The SP 139 is used to reproduce recorded voice information. The MIC 141 detects a voice around the camera 11, and is used for recording or determination of environment.

In the camera 11 having the configuration above, as an example, the image sensor 103, the analog processing unit 105, and the A/D converter 107 correspond to the imaging unit 2 illustrated in FIG. 1. As another example, the basic image processing unit 109a, or the basic image processing unit 109a and the special image processing unit 109b correspond to the image processing unit 4 illustrated in FIG. 1. As another example, the SDRAM 127 corresponds to the first storage unit 3 illustrated in FIG. 1. As another example, the subject detector 109d corresponds to the image analysis unit 5 illustrated in FIG. 1. As another example, the microcomputer 121 corresponds to the scenario generation unit 6 illustrated in FIG. 1. As another example, the image collage processing unit 109c corresponds to the image collage processing unit 7 illustrated in FIG. 1. As another example, the display panel 135 corresponds to the display unit 8 illustrated in FIG. 1. As another example, the recording medium 131 corresponds to the second storage unit 9 illustrated in FIG. 1. As another example, the operation unit 123 corresponds to the reception unit 10 illustrated in FIG. 1.

Figure 3B:
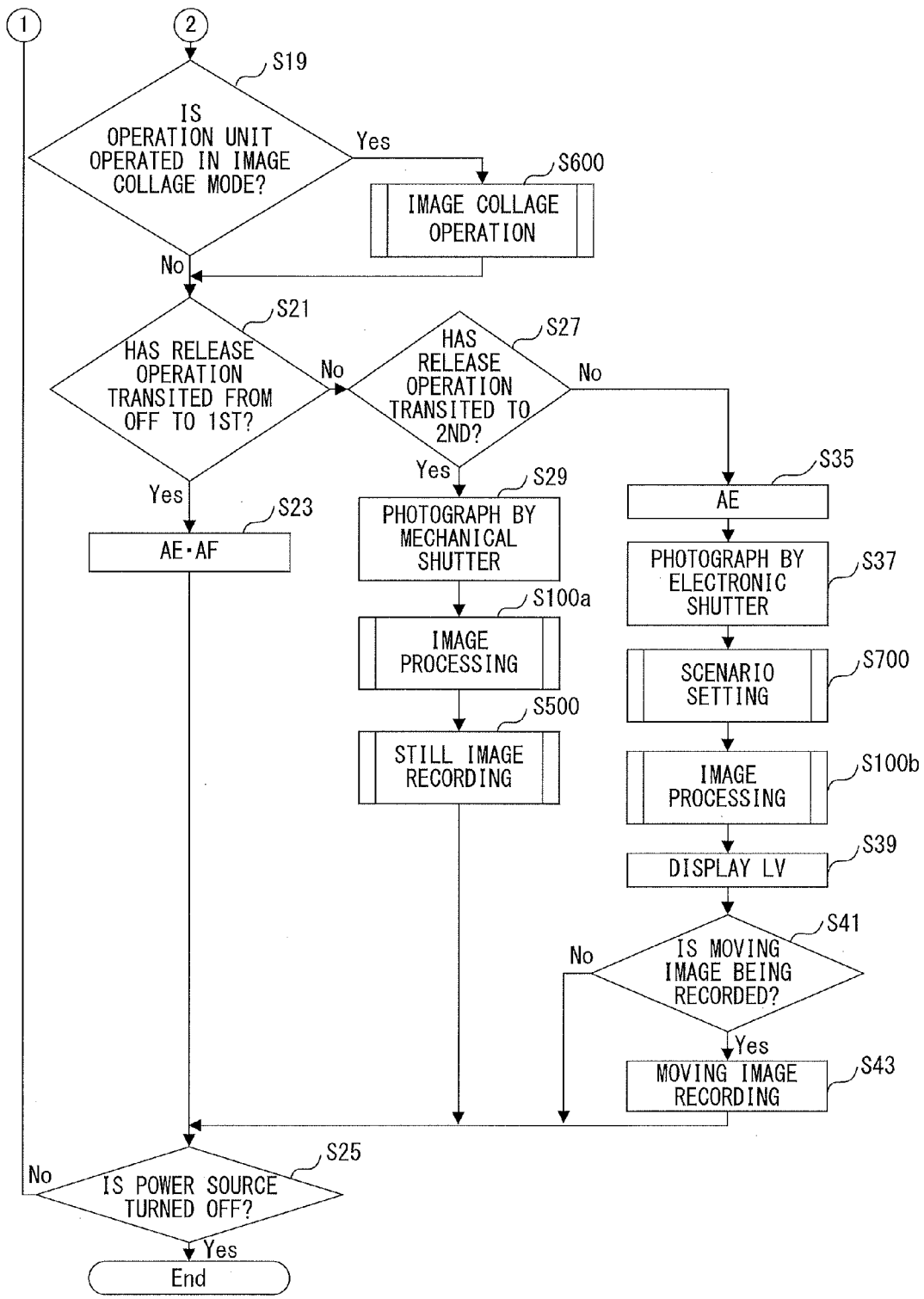
FIG. 3B is a flowchart (Part 2) illustrating the entire processing of a camera according to the embodiment of the present invention.

With reference to FIG. 3 to FIG. 10, processing performed by the camera 11 having the configuration above is described next. The processing illustrated in flowcharts of FIG. 3 to FIG. 10 of the camera 11 is performed by executing, by the microcomputer 121, a program stored in the flash memory 125. A flow of the entire processing of the camera, which is illustrated in FIG. 3 (FIG. 3A and FIG. 3B), is described first.

When a power button in the operation unit 123 is operated so as to turn on a power source of the camera 11 and the processing illustrated in FIG. 3 of the camera 11 is started, the microcomputer 121 initializes the camera 11 (step S1). Here, mechanical initialization and electrical initialization such as initialization of various flags are performed. Examples of flags to be initialized include a recording flag indicating whether a moving image is being recorded, and the recording flag is set to OFF by initialization.

When initialization is completed, the microcomputer 121 then determines whether a reproduction button has been depressed (step S3). Here, the microcomputer 121 performs determination by detecting an operation state of the reproduction button in the operation unit 123. When the reproduction button is displayed on the display panel 135, the microcomputer 121 performs determination by detecting a signal from the touch input unit 124.

When the reproduction button is depressed, the microcomputer 121 sets an operation mode to a reproduction mode, and performs reproduction processing (step S4). When the reproduction processing is completed, the process of step S3 is performed again. Detailed description of the reproduction processing is omitted, but as an example, the microcomputer 121 performs a process of displaying an image stored in the recording medium 131 on the display panel 135, or other processes.

When it is determined in step S3 that the reproduction button has not been depressed, the microcomputer 121 determines whether a menu button has been depressed, namely, whether a menu screen is displayed and the camera enters into a state in which camera settings are performed (step S5). Here, the microcomputer 121 performs determination by detecting an operation state of the menu button in the operation unit 123. When the menu button is displayed on the display panel 135, the microcomputer 121 performs determination by detecting a signal from the touch input unit 124.

When the menu button is depressed, the microcomputer 121 detects an operation that is further performed on the operation unit 123, and changes camera settings in accordance with a detection result (step S7). When camera setting processing is completed, the process of step S3 is performed again.

Examples of the camera setting include photographing mode setting, recoding mode setting, image finish setting, image collage scenario setting, setting of selecting previously obtained images to be incorporated into an image collage, setting of whether an image is recorded, or other settings. The photographing mode includes a normal photographing mode and an image collage mode. The recording mode includes JPEG recording, JPEG+RAW recording, RAW recording, and the like as a still image recording mode, and Motion-JPEG, H.264, and the like as a moving image recording mode. In the embodiment, as an example, it is assumed that JPEG recording is set as the still image recording mode. Further, the image finish setting includes setting of a special effect such as art filters for making an image appear natural (Natural), for making an image appear vivid (Vivid), and for making an image appear calm (Flat).

When it is determined in step S5 that the menu button has not been depressed, the microcomputer 121 determines whether a moving image button has been depressed (step S9). Here, the microcomputer 121 performs determination by detecting an operation state of the moving image button in the operation unit 123. When the moving image button is displayed on the display panel 135, the microcomputer 121 performs determination by detecting a signal from the touch input unit 124.

When it is determined that the moving image button has not been depressed, the microcomputer 121 performs the process of step S19. When the moving image button is depressed, the microcomputer 121 reverses the recording flag (step S11). Namely, when the recording flag is OFF, the recording flag is changed to ON, and when the recording flag is ON, the recording flag is changed to OFF. The microcomputer 121 further determines whether an image is being recorded on the basis of a state of the recording flag after reversal (step S13).

When it is determined that the recording flag is ON, the microcomputer 121 determines that the starting of moving image recording has been instructed, generates a moving image file (step S15), and prepares for recording image data. These processes are performed, for example, when the moving image button is depressed first after the power source is turned on. After the moving image file has been generated, the process of step S19 is performed.

When it is determined in step S13 that the recording flag is OFF, the microcomputer 121 determines that the termination of moving image recording has been instructed, and closes the moving image file (step S17). Namely, the microcomputer 121 performs a process of recording the number of frames in a header of the moving image file, or other processes such that the moving image file enters into a reproducible state, and finishes writing processing. After writing to the moving image file is finished, the process of step S19 is performed.

In step S19, the microcomputer 121 determines whether the photographing mode is the image collage mode, and whether a prescribed image collage operation has been performed on the operation unit 123. Here, the microcomputer 121 performs determination by detecting the setting of a photographing mode stored in the SDRAM 127 and an operation state of the operation unit 123.

When it is determined that the photographing mode is the image collage mode and that a prescribed operation has been performed, the microcomputer 121 performs image collage operation processing (step S600). When the image collage operation processing is completed, the process of step S21 is performed. Details of the image collage operation processing are described later with reference to FIG. 9.

When it is determined in step S19 that the photographing mode is not the image collage mode or that a prescribed image collage operation has not been performed on the operation unit 123, the microcomputer 121 determines whether a release button has been depressed halfway (step S21). Here, the microcomputer 121 performs determination by detection transition of a first release switch linked with the release button from OFF to ON. When the release button is displayed on the display panel 135, or when the display panel 135 functions as the release button, the microcomputer 121 performs determination by detecting a signal indicating that a region where the release button is displayed or a display region where a live-view image is displayed has been touched.

When the release button is depressed, the microcomputer 121 performs AE and AF operations (step S23). Here, the AE operation is performed by the AE processing unit 111 detecting subject luminance on the basis of image data obtained by the image sensor 103, and calculating a shutter speed, a diaphragm value and the like that realize proper exposure on the basis of the subject luminance. The AF operation is performed by the driver 205 moving a focal position of the photographic lens 201 via the microcomputer 207 in the interchangeable lens 200 such that a focusing evaluated value obtained by the AF processing unit 113 has a peak value. When the AF operation is performed in reply to a signal from the touch input unit 124, the photographic lens 201 is moved so as to be focused on a subject displayed at a touch position. After performing the AE and AF operations, the process of step S25 is performed. The AF operation may be performed by adopting various AF methods such as the phase detection AF using a dedicated sensor, other than the so-called contrast AF described above.

When it is determined in step S21 that the release button has not been depressed halfway, the microcomputer 121 determines whether the release button has been fully depressed (step S27). Here, the microcomputer 121 performs determination by detecting a transition of a second release switch from OFF to ON. Consecutive photographing may be performed by consecutively detecting and determining that the second release switch is in an ON state. When the release button is displayed on the display panel 135, or when the display panel 135 functions as the release button, the microcomputer 121 performs determination by detecting a signal indicating that a region in which the release button is displayed or a display region in which a live-view image is displayed has been touched.

When the release button is fully depressed, the microcomputer 121 performs still image photographing by using the mechanical shutter (step S29). Here, the diaphragm 203 is controlled on the basis of the diaphragm value calculated in step S23, and a shutter speed of the mechanical shutter 101 is controlled on the basis of the calculated shutter speed value. When an exposure time that corresponds to the shutter speed has passed, an image signal is read from the image sensor 103, and RAW data processed by the analog processing unit 105 and the A/D converter 107 is temporarily stored in the SDRAM 127 via the bus 110.

The microcomputer 121 then reads out the RAW data temporarily stored in the SDRAM 127, has the image processing unit 109 perform image processing (step S100a), and performs still image recording processing for recording processed image data or the like in the recording medium 131 (step S500). Details of the image processing and the still image recording processing are described later with reference to FIG. 4 to FIG. 7 and FIG. 8, respectively. When the still image recording processing is completed, the microcomputer 121 performs the process of step S25.

When it is determined in step S27 that the release button has not been fully depressed, the microcomputer 121 performs the AE operation for a moving image or a live-view image (step S35). The AE operation is performed by the AE processing unit 111 calculating a shutter speed of the electronic shutter of the image sensor 103 and ISO sensitivity for performing a live-view display at a proper exposure.

After the AE operation is performed, the microcomputer 121 performs photographing by using the electronic shutter (step S37). Here, an image signal is read from the image sensor 103 by using the electronic shutter, and the RAW data processed by the analog processing unit 105 and the A/D converter 107 is temporarily stored in the SDRAM 127 via the bus 110.

Then, the microcomputer 121 performs processing of setting a scenario for an image collage only in the case when the photographing mode is the image collage mode (step S700). Details of the scenario setting processing are described later with reference to FIG. 10. When the scenario setting processing is completed, the microcomputer 121 reads out the RAW data temporarily stored in the SDRAM 127 in S37, and has the image processing unit 109 perform image processing that is similar to the image processing in photographing by using the mechanical shutter (step S100b). Under the control of the microcomputer 121, the display driver 133 controls the display panel 135 so as to update a live-view image by changing an image in the display region in which a live-view image is displayed to image data that has been obtained in step S37 and on which image processing has been performed in step S100b (step S39).

When the live-view image is updated, the microcomputer 121 determines whether a moving image is being recorded (step S41). Here, the microcomputer 121 performs determination on the basis of a state of a recording flag stored in the SDRAM 127.

When the recording flag is OFF, the microcomputer 121 performs the process of step S25. When the recording flag is ON, the microcomputer 121 determines that a moving image is being recorded, and records the moving image (step S43). Namely, the microcomputer 121 records the image data of the live-view image updated in step S39 as a frame image of the moving image file generated in step S15.

The microcomputer 121 then performs the process of step S25.

In step S25, the microcomputer 121 determines whether the power source is OFF. When the power source is ON, the microcomputer 121 performs the process of step S3. When the power source is OFF, the microcomputer 121 performs needed termination processing, and finishes the processing of the camera 11.

With reference to FIG. 4 to FIG. 7, image processing performed after photographing by the mechanical shutter, or after photographing by the electronic shutter and scenario setting, which is illustrated in FIG. 3, is described in more detail.

An object on which image processing is performed after photographing by the mechanical shutter is RAW data obtained by photographing by the mechanical shutter, and an object on which image processing is performed after photographing by the electronic shutter and scenario setting is RAW data obtained by photographing by the electronic shutter.

Figure 4:
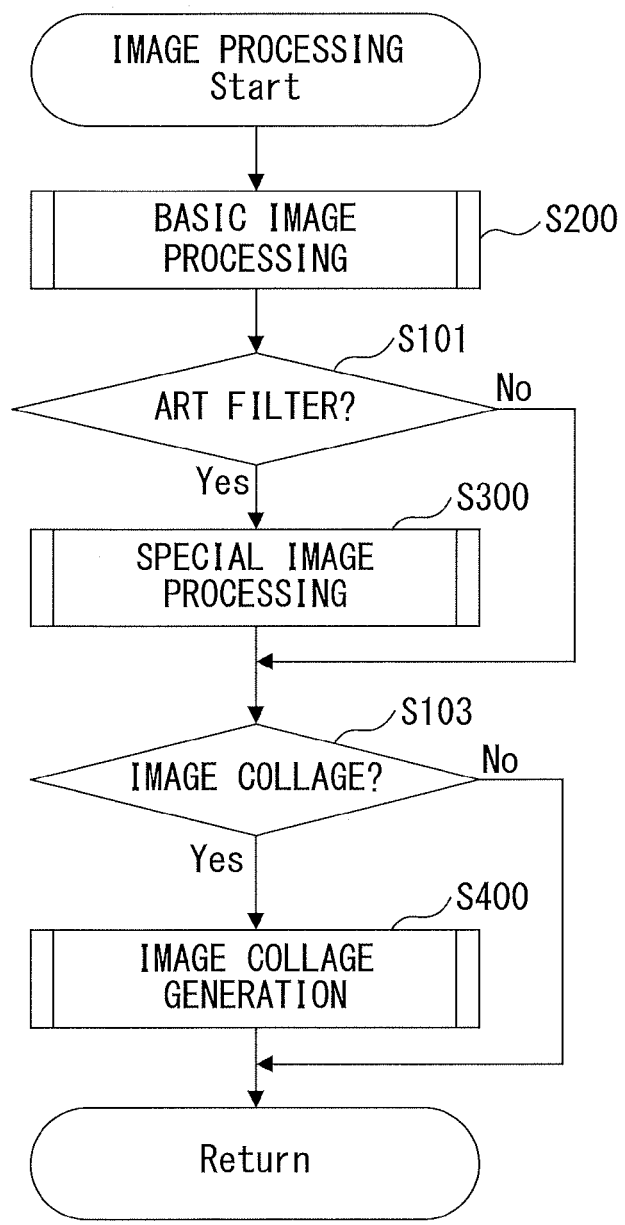
FIG. 4 is a flowchart illustrating image processing of a camera according to the embodiment of the present invention.

As illustrated in FIG. 4, the image processing is mainly configured of basic image processing performed by the basic image processing unit 109*a*, special image processing performed by the special image processing unit 109*b*, and image collage generation processing performed by the image collage processing unit 109*c*.

When the microcomputer 121 reads out the RAW data temporarily stored in the SDRAM 127 and instructs that the image processing unit 109 performs image processing, the basic image processing unit 109*a* first performs the basic image processing on the read RAW data (step S200).

Figure 5:
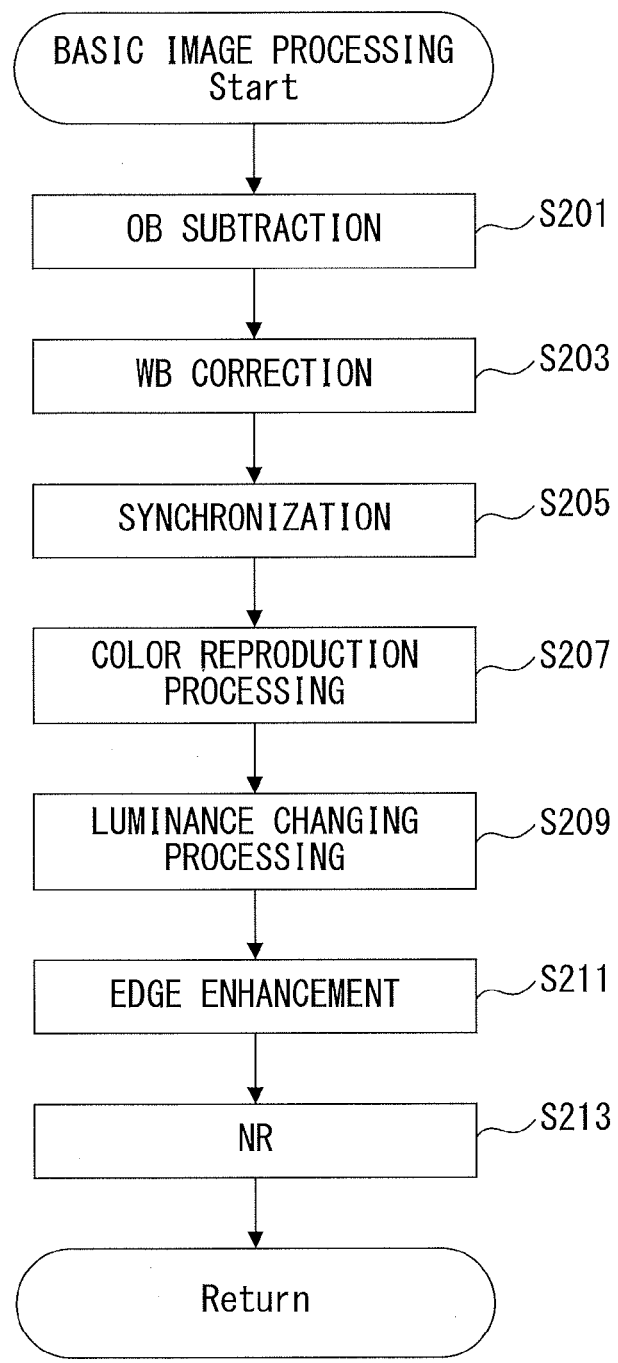
FIG. 5 is a flowchart illustrating basic image processing of a camera according to the embodiment of the present invention.

The basic image processing performed by the basic image processing unit 109*a* is configured of seven image processing steps, as illustrated in FIG. 5. First, optical black (OB) subtraction is performed (step S201). In this step, an OB operation unit in the basic image processing unit 109*a* subtracts an optical black value resulting from a dark current or the like of the image sensor 103 from pixel values of respective pixels configuring image data.

After the OB subtraction, white balance (WB) correction is performed (step S203). In this step, a WB correction unit in the basic image processing unit 109*a* performs WB correction on image data in accordance with a set white balance mode. Specifically, an R gain and a B gain according to a white balance mode set by a user is read from the flash memory 125 of the camera body, and correction is performed by multiplying the image data by the R gain and the B gain. When the auto white balance has been set, an R gain and a B gain are calculated from RAW data, and correction is performed by using the R gain and the B gain.

Then, synchronization is performed (step S205). In this step, a synchronization processing unit in the basic image processing unit 109*a* performs processing of converting data (Bayer data) of each of the pixels into RGB data on image data on which white balance correction has been performed. Specifically, data that is not included in each of the pixels is obtained from the periphery through interpolation, and the data is converted into RGB data. This step is omitted when RAW data includes plural pieces of data per pixel, e.g., when an image sensor in the FOVEON (a registered trademark of Foveon, Inc.) format is used for the image sensor 103.

After the synchronization, color reproduction processing is performed (step S207). In this step, a color reproduction processing unit in the basic image processing unit 109*a* corrects color of image data by performing linear conversion in which image data is multiplied by a color matrix coefficient according to a set white balance mode. The color matrix coefficient has been stored in the flash memory 125, and therefore the color matrix coefficient is read out and used.

After the color reproduction processing, luminance changing processing is performed (step S209). In this step, a luminance changing processing unit in the basic image processing unit 109*a* performs gamma correction processing on image data (RGB data). The luminance changing processing unit further performs color conversion from RGB data to YCbCr data, and performs gamma correction on Y data of the converted image data. In the gamma correction, a gamma table stored in the flash memory 125 is read out and used.

After the luminance changing processing, edge enhancement is performed (step S211). In this step, an edge enhancement processing unit in the basic image processing unit 109*a* extracts an edge component with a band-pass filter, multiplies the edge component by a coefficient in accordance with an edge enhancement degree, and adds the multiplied edge component to image data so as to enhance an edge of the image data.

Finally, NR (noise reduction) is performed (step S213). In this step, an NR unit in the basic image processing unit 109*a* performs processing of reducing noise by performing frequency resolution on an image, and by performing coring processing in accordance with a frequency.

When the basic image processing above is completed, in a case in which a special effect (art filter) has been set, the special image processing unit 109*b* performs special image processing on image data processed by the basic image processing unit 109*a* (step S101 and S300 of FIG. 4).

Figure 6:
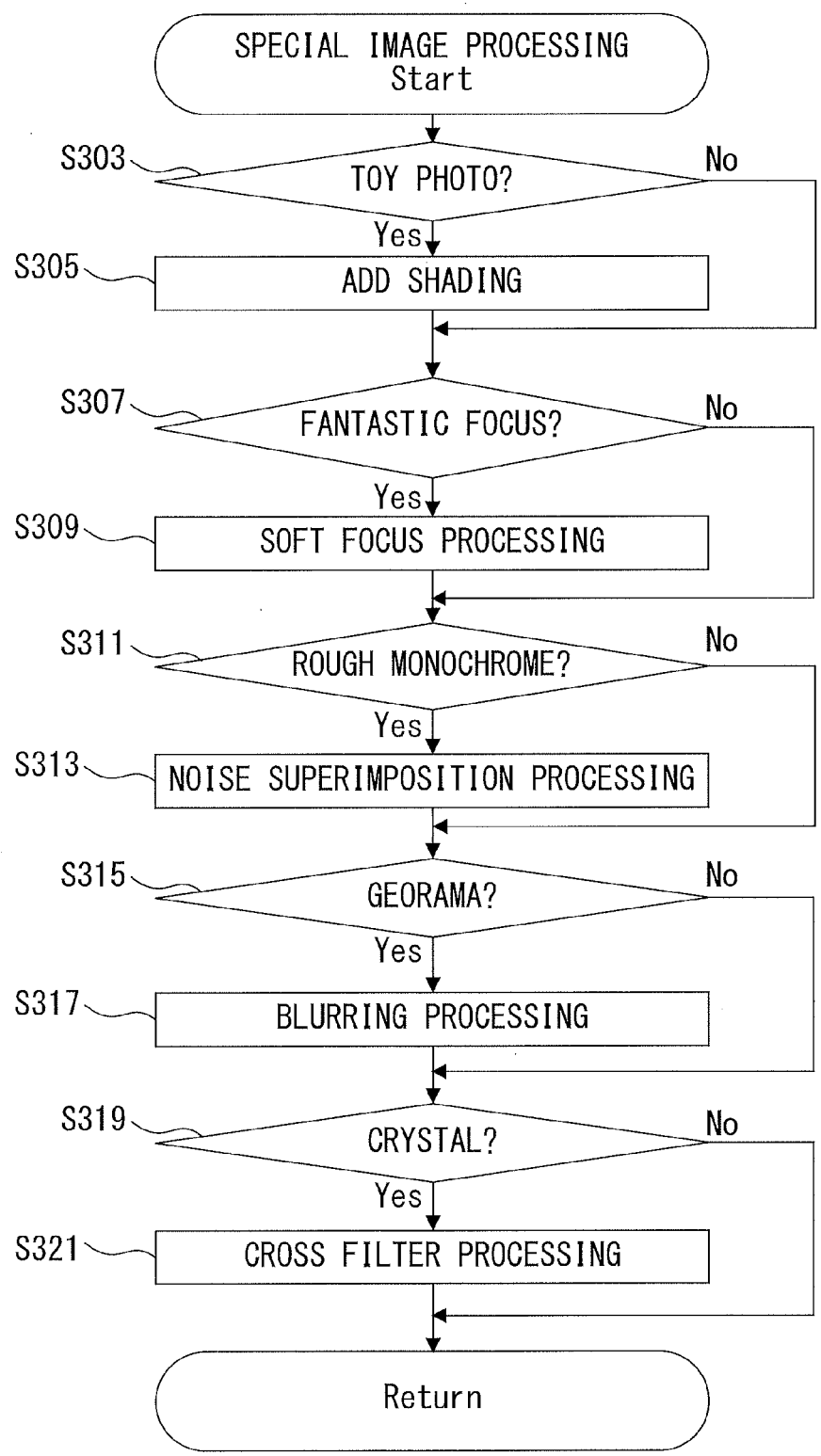
FIG. 6 is a flowchart illustrating special image processing of a camera according to the embodiment of the present invention.

The special image processing performed by the special image processing unit 109*b* is mainly configured of five image processing steps performed in accordance with special effect settings, as illustrated in FIG. 6.

Specifically, it is sequentially determined whether Toy Photo, Fantastic Focus, Rough Monochrome, Diorama, and Crystal have been set as a special effect (art filter) (step S303, step S307, step S311, step S315, and step S319).

When Toy Photo has been set, shading addition processing is performed on image data (step S305). In this step, the special image processing unit 109*b* generates a gain map (with a gain value equal to or smaller than 1) in which luminance gradually decreases according to a distance from the center, and multiplies the image data by a gain that corresponds to each of the pixels in accordance with the gain map so as to add shading to the periphery.

When Fantastic Focus has been set, soft focus processing is performed on image data (step S309). In this step, the special image processing unit 109*b* generates image data generated by performing blurring processing on the entirety of an image, and combines image data of an image before blurring and image data of an image after blurring at a prescribed ratio (for example, 3:2).

When Rough Monochrome has been set, noise superimposition processing is performed on image data (step S313). In this step, the special image processing unit 109*b* adds a previously generated noise pattern to the image data. The noise pattern may be generated on the basis of random numbers or the like.

When Diorama has been set, blurring processing is performed on image data (step S317). In this step, the special image processing unit 109*b* gradually blurs the periphery (for example, upper and lower portions, left-side and right-side portions, or both of them) of an image around an AF target according to a distance.

When Crystal has been set, cross-filter processing is performed on image data (step S321). In this step, the special image processing unit 109*b* detects a bright spot in an image, and processes the image data such that a cross pattern is drawn around the bright spot.

When the special image processing above is completed, the image collage processing unit 109c determines whether the photographing mode is the image collage mode (step S103 in FIG. 4). When the photographing mode is not the image collage mode, image processing is finished.

When the photographing mode is the image collage mode, the image collage processing unit 109c performs image collage generation processing by using pieces of image data of a plurality of images displayed in a plurality of display regions of the display panel 135 (step S400 of FIG. 4).

Figure 7:
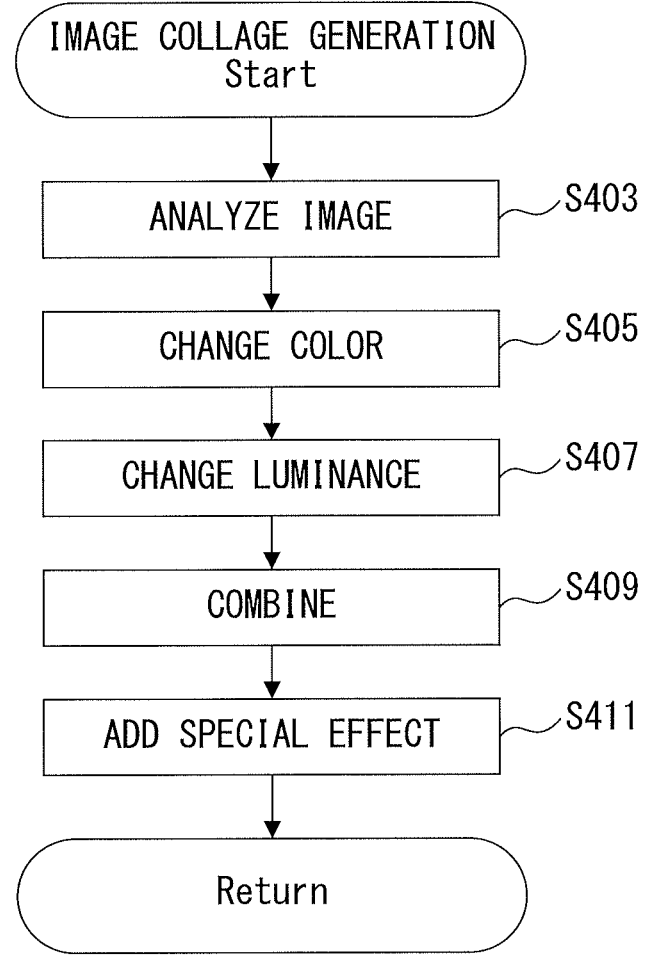
FIG. 7 is a flowchart illustrating image collage generation processing of a camera according to the embodiment of the present invention.

The image collage generation process performed by the image collage processing unit 109c is configured of five image processing steps, as illustrated in FIG. 7.

First, image analysis is performed (step S403). In this step, the image collage processing unit 109c calculates color distribution and luminance distribution that each of the pieces of image data of the plurality of images displayed in the display regions of the display panel 135 has. The color distribution and the luminance distribution may be calculated not from each of the pieces of image data of the images displayed in the display regions (namely, the image data processed by the basic image processing unit 109a and the special image processing unit 109b) but from RAW data that corresponds to each of the pieces of image data and on which image processing has not been performed.

Figure 11A:
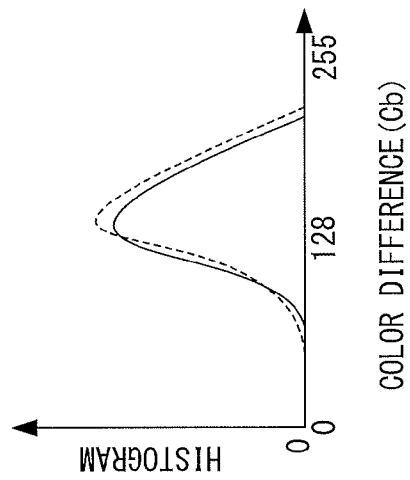
FIG. 11A is the first diagram explaining color change processing performed by an image collage processing unit of a camera according to the embodiment of the present invention.
Figure 11B:
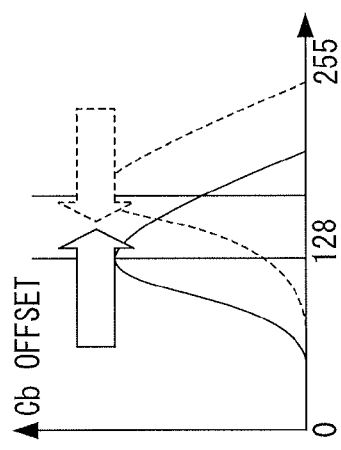
FIG. 11B is the second diagram explaining color change processing performed by an image collage processing unit of a camera according to the embodiment of the present invention.
Figure 11C:
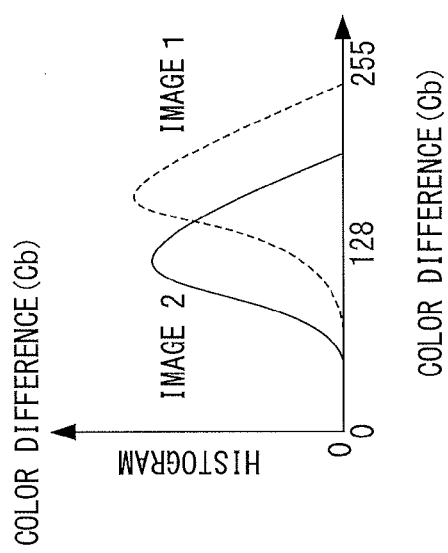
FIG. 11C is the third diagram explaining color change processing performed by an image collage processing unit of a camera according to the embodiment of the present invention.
Figure 11D:
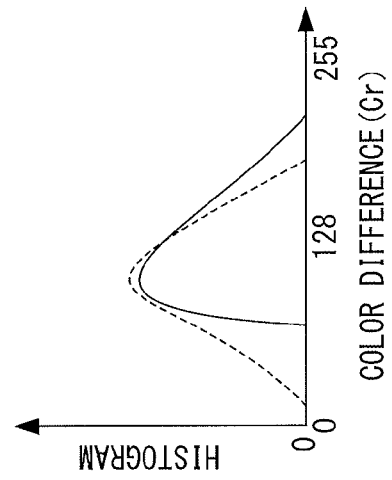
FIG. 11D is the fourth diagram explaining color change processing performed by an image collage processing unit of a camera according to the embodiment of the present invention.
Figure 11E:
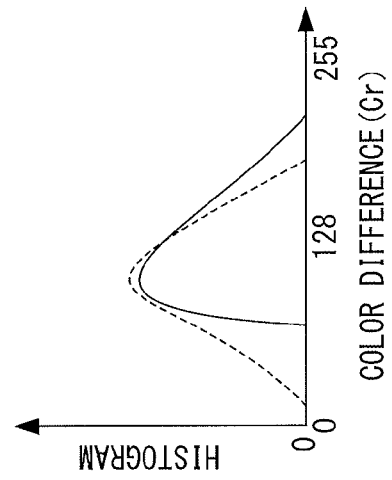
FIG. 11E is the fifth diagram explaining color change processing performed by an image collage processing unit of a camera according to the embodiment of the present invention.
Figure 11F:
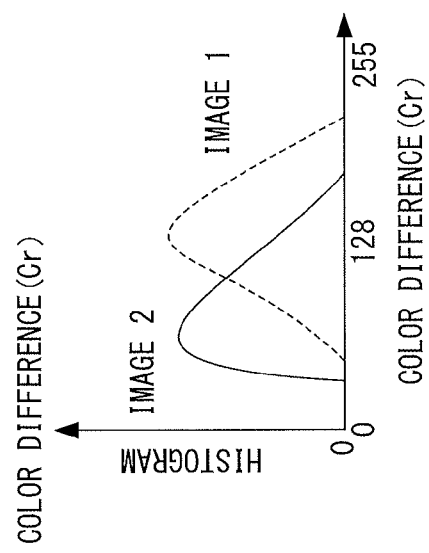
FIG. 11F is the sixth diagram explaining color change processing performed by an image collage processing unit of a camera according to the embodiment of the present invention.

After the image analysis, color changing processing is performed such that images of plural pieces of image data configuring an image collage have almost the same color (step S405). In this step, the image collage processing unit 109c offsets and corrects a color difference Cb and a color difference Cr of each of the plural pieces of image data such that peaks of the color differences Cb or the color differences Cr of the plural pieces of image data have an average value of the peaks. As an example, when color distributions (distributions of a color difference) as illustrated in FIG. 11A and FIG. 11D are calculated as a result of image analysis, distributions of the color difference Cb and the color difference Cr are offset as illustrated in FIG. 11B and FIG. 11E. As a result, a plurality of images on which color changing processing has been performed have almost the same color, as illustrated in FIG. 11C and FIG. 11F.

A color changing method in the color changing processing can be realized by a method other than the method above for changing the color difference Cb and the color difference Cr, e.g., a method for multiplying R and B by gains in an RGB color space.

After the color changing processing, luminance changing processing is further performed such that images of plural pieces of image data configuring an image collage have almost the same luminance (step S407). In this step, the image collage processing unit 109c corrects respective pieces of image data such that an average of luminance distribution of each of the plural pieces of image data is an average of luminance distribution of all of the plural pieces of image data. As an example, when distributions of luminance Y as illustrated in FIG. 12A are obtained as a result of image analysis, the distributions of luminance Y are corrected by performing different gamma conversions on RGB data of respective pieces of image data, as illustrated in FIG. 12B, such that a plurality of images have almost the same luminance, as illustrated in FIG. 12C. The reason why luminance is corrected by performing gamma conversion in the RGB color space, and not performing gamma conversion on luminance components, is that a color of an image is prevented from being unnatural even when luminance is greatly changed as a result of the correction.

A method for changing luminance in the luminance changing processing can be realized by a method other than the method above using gamma changing, e.g., a method for changing luminance only in a dark region such as the shade or a method for changing luminance only in a bright region.

After the luminance changing processing, combination processing for combining plural pieces of image data for which color and luminance have been corrected is performed (step S409). In this step, the image collage processing unit 109c combines pieces of image data of a plurality of images displayed in a plurality of display regions of the display panel 135, or more specifically, plural pieces of image data on which the color changing processing and the luminance changing processing have been performed on the basis of a set image collage scenario, and generates image data of an image collage formed by laying out the plurality of images as illustrated on the display panel 135.

Finally, the special image processing unit 109b imparts a special effect such as blurring processing or an addition of shading, which is an effect applicable by an art filter or the like, in accordance with the scenario for the image collage, regardless of finish setting in camera settings (step S411), and finishes the image collage generation processing. The image collage generated as described above is also reflected in the display on the display panel 135. Thus, the image processing of FIG. 4 is finished.

With the camera 11 that generates an image collage by operating as described above, each of the plurality of images configuring an image collage is corrected on the basis of a result of comparison with another image. Image data of the image collage is generated by combining pieces of image data of the corrected images. Therefore, compared with a conventional camera in which image processing is performed individually on images, images that are balanced with each other in tint or brightness and that are satisfactory for an image collage can be obtained. FIG. 7 illustrates an example in which the color changing processing and the luminance changing processing are performed on respective images, but image processing performed on the basis of comparison results with another image is not limited to these, and another image processing may be performed.

Figure 8:
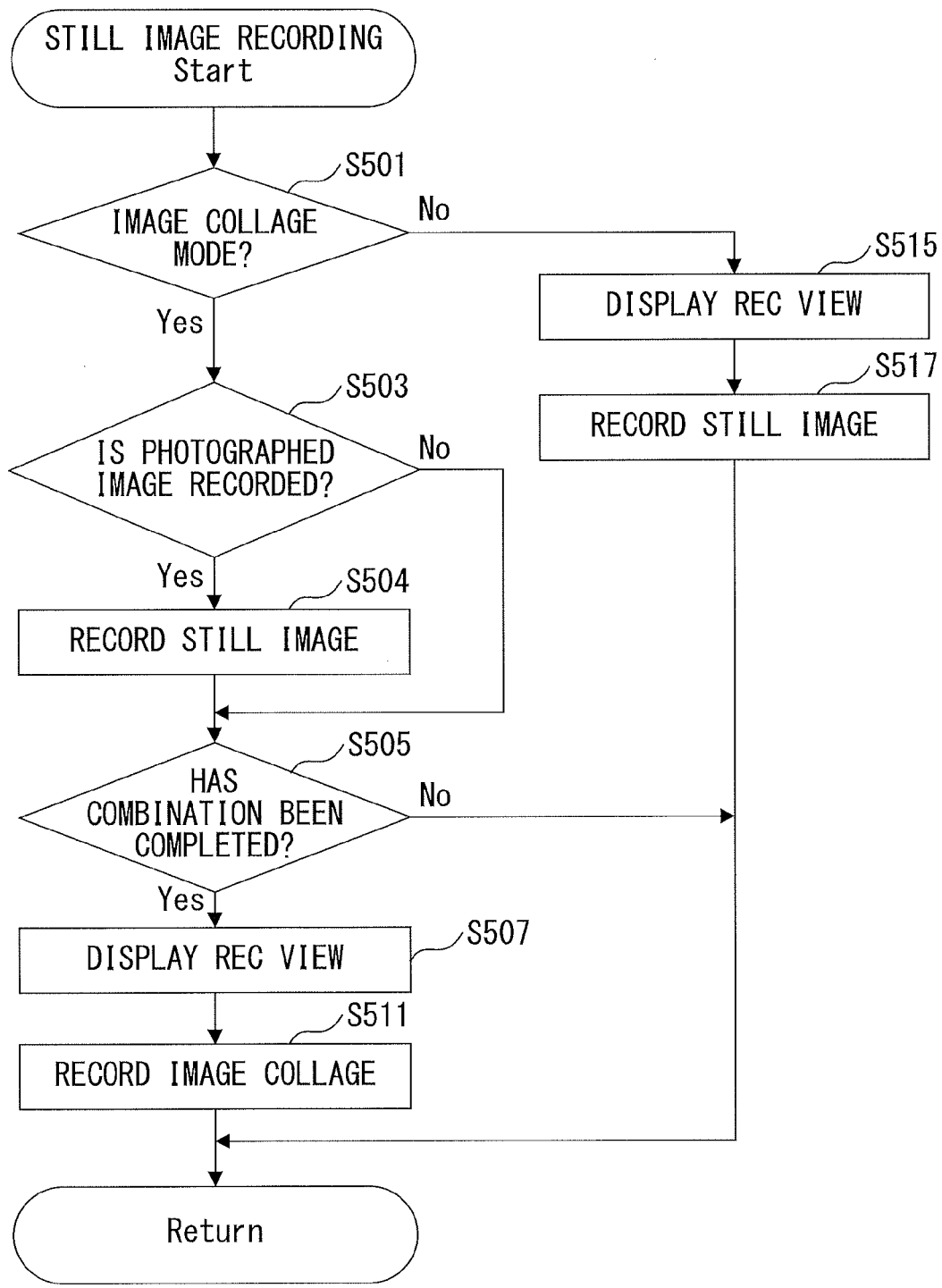
FIG. 8 is a flowchart illustrating still image recording processing of a camera according to the embodiment of the present invention.

With reference to FIG. 8, still image recording, which is performed after image processing on image data that is obtained by the mechanical shutter photographing illustrated in FIG. 3, is described next in more detail.

As illustrated in FIG. 8, when still image recording processing is started, the microcomputer 121 first determines whether the photographing mode is the image collage mode (step S501). In this step, the microcomputer 121 performs determination on the basis of setting of a photographing mode stored in the SDRAM 127.

When the photographing mode is not the image collage mode, the microcomputer 121 controls the display driver 133 so as to display, on the display panel 135, a Rec View of a single image of image data that has been photographed by the mechanical shutter, and on which image processing has been performed by the image processing unit 109 (step S515).

The microcomputer 121 then controls the memory I/F 129 so as to record the image data of the displayed image in the recording medium 131 (step S517), and finishes the still image recording processing. The image data may be recorded after being compressed in the JPEG format by the image compressor/expander 117, or may be recorded without being compressed. Further, RAW data on which image processing has not been performed by the image processing unit 109 may also be recorded.

When the photographing mode is the image collage mode, the microcomputer 121 determines whether setting has been performed so as to record a frame image (also referred to as a "photographed image"), which is an image that is photographed in order to configure an image collage (step S503). When setting has been performed so as to record a frame image, the microcomputer 121 controls the memory I/F 129 so as to record a frame image processed by the image processing unit 109 in the recording medium 131 (step S504).

The microcomputer 121 then determines whether combination has been completed, namely, whether all of the frame images configuring an image collage have been photographed (step S505). When previously obtained images to be incorporated into an image collage have been set, the microcomputer 121 determines whether all of the frame images other than the previously obtained images have been photographed. In this step, determination is performed on the basis of whether frame images of a number determined in accordance with a set scenario for an image collage have been stored in a frame image region of the SDRAM 127. When not all of the frame images have been photographed, the still image recording processing is finished.

When all of the frame images have been photographed, the microcomputer 121 controls the display driver 133 so as to display a Rec View of the image collage generated by the image processing unit 109 on the display panel 135 (step S507).

The microcomputer 121 then controls the memory I/F 129 so as to record image data of the image collage generated by the image processing unit 109 in the recording medium 131 (step S511), and finishes the still image recording processing.

Figure 9:
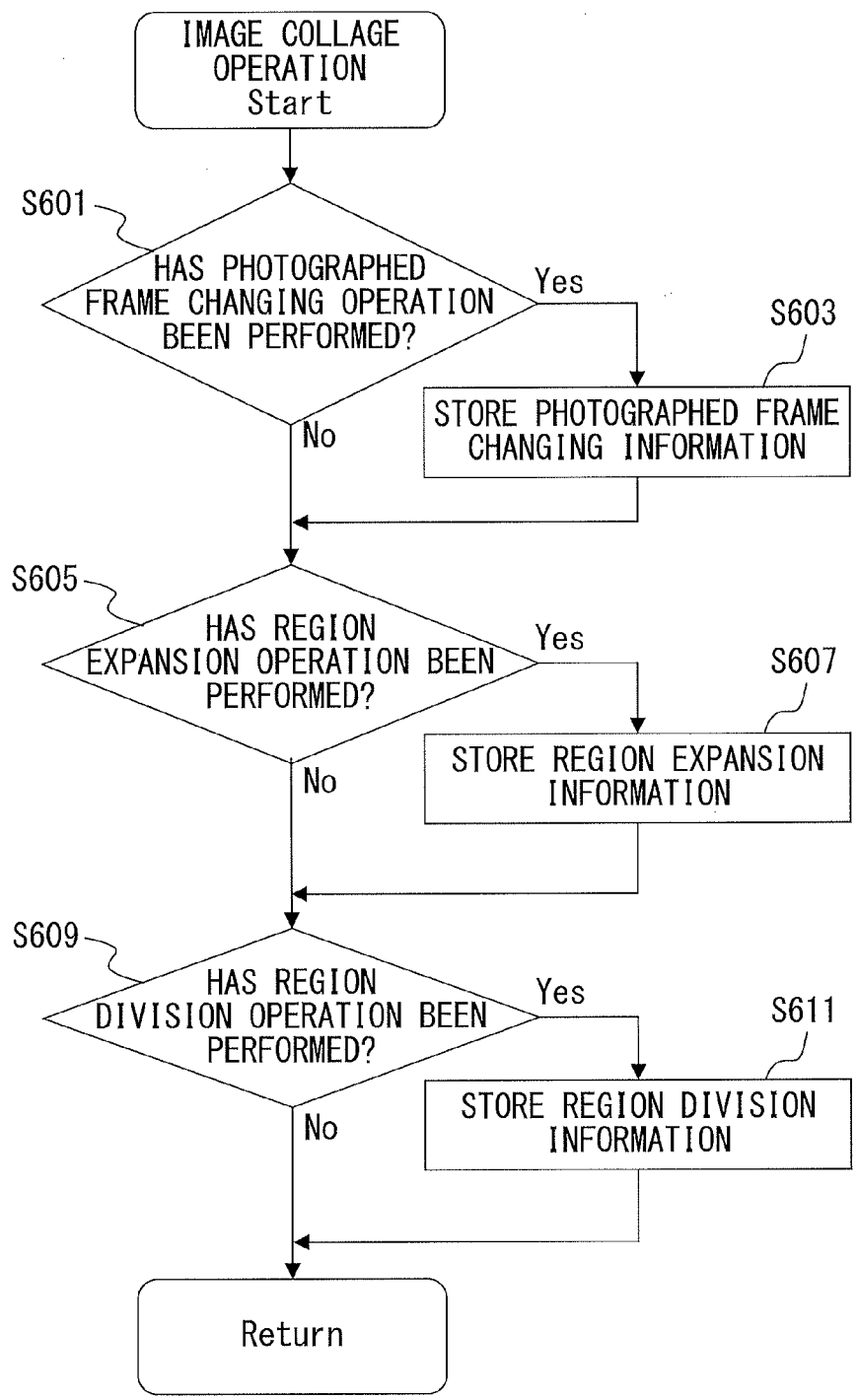
FIG. 9 is a flowchart illustrating image collage operation processing of a camera according to the embodiment of the present invention.

With reference to FIG. 9, the image collage operation processing is described next in more detail.

As illustrated in FIG. 9, when the image collage operation processing is started, an operation that has caused the image collage operation processing to be started is specified. Specifically, the microcomputer 121 sequentially determines whether a photographed frame changing operation, a region expansion operation, and a region division operation have been performed (step S601, step S605, and step S609). The photographed frame changing operation, the region expansion operation, and the region division operation are examples of an operation that corresponds to a scenario changing instruction.

Determination in step S601 of whether the photographed frame changing operation has been performed is performed, for example, on the basis of whether the touch input unit 124 has detected a touch operation in a display region in which no images are displayed. When a touch operation is detected in a display region in which no images are displayed, the microcomputer 121 performs photographed frame changing information storage processing, namely, processing of storing, in the SDRAM 127, information for switching display regions to display a live-view image and for displaying the live-view image in a touched display region (step S603).

In this step, a display region in which no images are displayed may be specified by performing a key operation of, for example, cross keys, instead of the touch operation.

Determination in step S605 of whether the region expansion operation has been performed is performed, for example, on the basis of whether the touch input unit 124 has detected a touch operation for tracing a boundary between a display region in which a live-view image is displayed and a display region in which no images are displayed. When such a touch operation is detected, the microcomputer 121 performs region expansion information storage processing, namely, processing of storing, in the SDRAM 127, information for integrating the display region in which a live-view image is displayed and the display region in which no images are displayed, both of the display regions being adjacent to the boundary at which the touch operation has been detected, into one display region, and for displaying the live-view image in the integrated display region (step S607).

Determination in step S609 of whether the region division operation has been performed is performed, for example, on the basis of whether the touch input unit 124 has detected a touch operation for tracing two points on an outer periphery of a display region in which a live-view image is displayed from one point to another point. When such a touch operation is detected, the microcomputer 121 performs region division information storage processing, namely, processing of storing, in the SDRAM 127, information for dividing the display region into two regions at a portion between the two points at which the touch operation has been detected as a boundary, and for displaying the live-view image in one of the two regions (step S611).

Thus, the image collage operation processing in FIG. 9 is finished.

Figure 10:
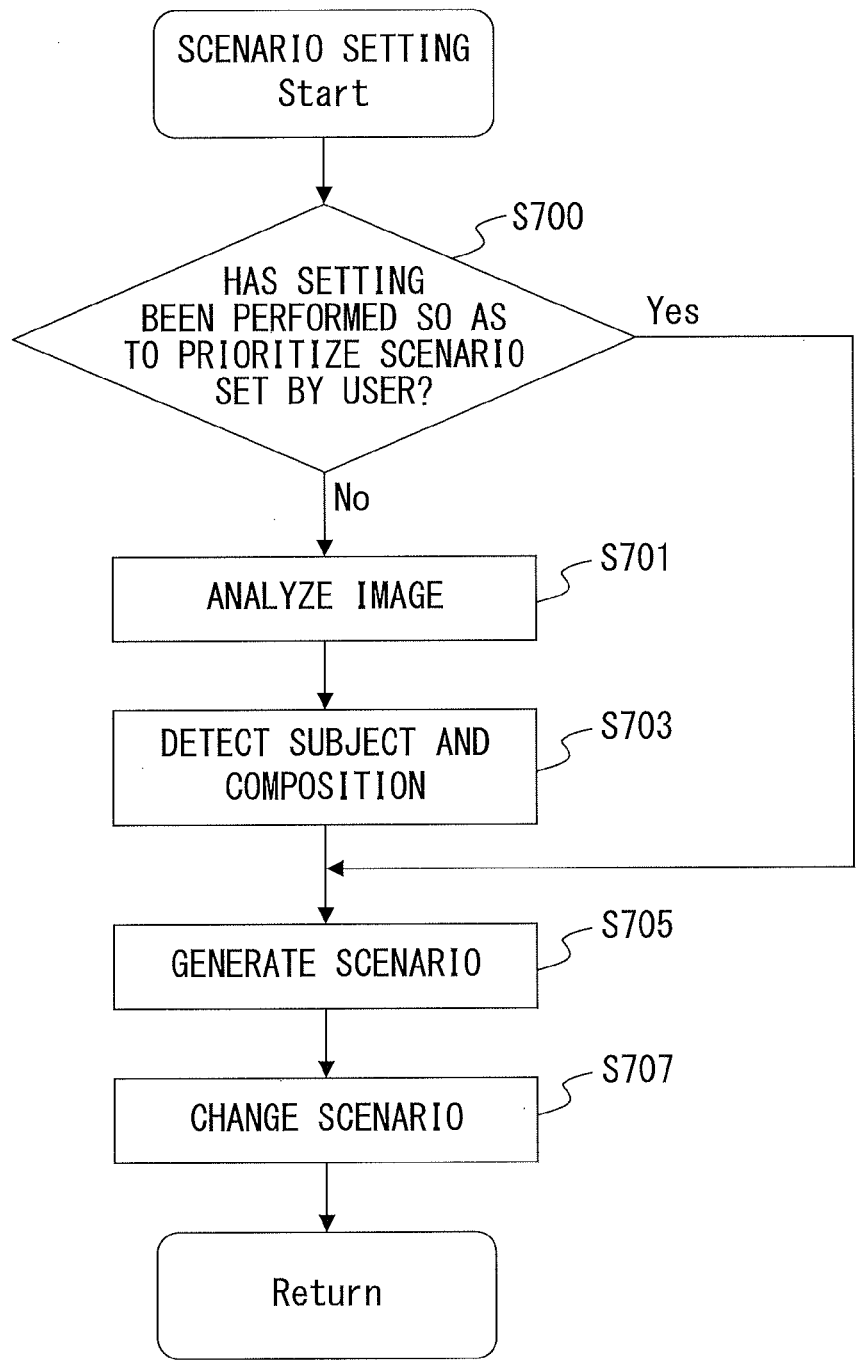
FIG. 10 is a flowchart illustrating scenario setting processing of a camera according to the embodiment of the present invention.

With reference to FIG. 10, the image collage scenario setting processing is described next in more detail. In the image collage scenario setting processing, four steps, steps S701, S703, S705, and S707, or two steps, steps S705 and S707, are performed in accordance with a determination result in step S700, as illustrate in FIG. 10.

Specifically, the microcomputer 121 first determines whether setting has been performed so as to prioritize a scenario set by a user in the camera setting in S7 (see FIG. 3) (step S700).

When the microcomputer 121 determines that setting has not been performed so as to prioritize a scenario set by a user (No in step S700), the microcomputer 121 obtains a live-view image, and performs image analysis (step S701). Specifically, the microcomputer 121 obtains either RAW data that has been temporarily stored in the SDRAM 127 in step S37 (see FIG. 3) or image data generated by performing at least the basic image processing on the RAW data, as image data to be analyzed, and analyzes elements needed to generate a scenario, such as a type or feature of a subject represented in the image data to be analyzed (a still subject or a moving subject, an animal such as a pet, a vehicle, a landscape such as mountains, the sea, or the sky, a still life such as furniture or tableware, a building structure such as a bridge or a building, a road, or the like), a distance to the subject, a position in an angle of view, a size, or the number of subjects. The microcomputer 121 then obtains information relating to a subject and a composition (step S703). The information relating to a subject and a composition is information indicating, for example, what type of subject is arranged or how the subject is arranged.

The microcomputer 121 then generates an appropriate scenario (scenario data) on the basis of the obtained information relating to a subject and a composition (step S705). When the scenario changing instruction (the photographed frame changing operation, the region expansion operation, or the region division operation) has been issued, the microcomputer 121 generates the appropriate scenario (scenario data) on the basis of corresponding information stored in the SDRAM 127 (the photographed frame changing information, the region expansion information, or the region division information) and the information relating to a subject and a composition obtained in step S703. The microcomputer 121 then changes the set scenario to the generated scenario (step S707).

When the microcomputer 121 determines that setting has been performed so as to prioritize a scenario set by a user (Yes in step S700), the processes of steps S701 and S703 are skipped, and the microcomputer 121 generates a corresponding scenario (scenario data) on the basis of corresponding information stored in the SDRAM 127 (the photographed frame changing information, the region expansion information, or the region division information) only when the scenario changing instruction (the photographed frame changing operation, the region expansion operation, or the region division operation) has been issued (step S705), and changes the set scenario to the generated scenario (step S707). Thus, the image collage scenario setting processing in FIG. 10 is finished.

Figure 13A:
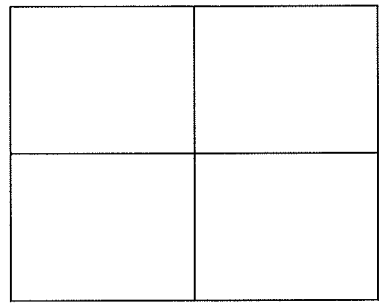
FIG. 13A is the first diagram explaining an image collage realized in accordance with a scenario (the number of divisions and a division form) set in a camera according to the embodiment of the present invention.
Figure 13B:
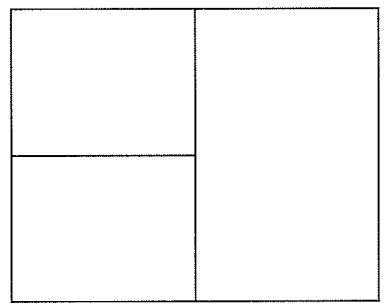
FIG. 13B is the second diagram explaining an image collage realized in accordance with a scenario (the number of divisions and a division form) set in a camera according to the embodiment of the present invention.
Figure 13C:
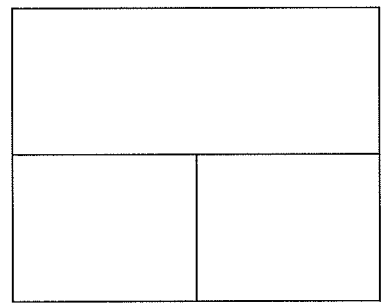
FIG. 13C is the third diagram explaining an image collage realized in accordance with a scenario (the number of divisions and a division form) set in a camera according to the embodiment of the present invention.
Figure 13D:
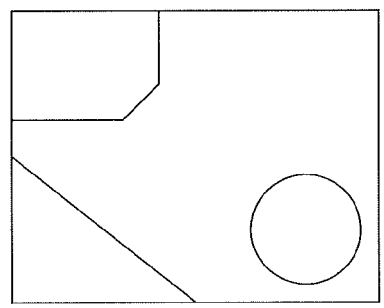
FIG. 13D is the fourth diagram explaining an image collage realized in accordance with a scenario (the number of divisions and a division form) set in a camera according to the embodiment of the present invention.

An image collage realized by a scenario set in the camera 11 is, for example, an image collage having a number of divisions and a division form illustrated in FIG. 13A, FIG. 13B, FIG. 13C, or FIG. 13D. The image combinations illustrated in FIG. 13A and FIG. 13D have the same number of divisions, four, but have different division forms. The image combinations illustrated in FIG. 13B and FIG. 13C have the same number of divisions, three, but have different division forms. The division form is not limited to a quadrangle, and may be another polygon, a circle, or the like, as illustrated in FIG. 13D.

In addition, the scenario setting in FIG. 10 may be performed in appropriate cycles, may be performed for respective frames of a live-view image, or may be performed when image data of a field is changed.

In the camera 11 that operates as described above, the following display is performed on the display panel 135 on the basis of a set image collage scenario.

When the subject detector 109d determines that main subjects are persons, the number of persons can be determined from the number of detected faces. An example of this is described below.

As an example, when a live-view image is arranged and displayed in an upper-left display region, as illustrated in FIG. 14A, and when a photographing instruction is issued, a frame image (a photographed image obtained in reply to the photographing instruction above) is arranged in the upper-left display region, and faces of the persons represented in the live-view image (see FIG. 14C) are respectively arranged and displayed in the other display regions, as illustrated in FIG. 14B. This display is performed according to a scenario generated on the basis of an analysis result of the live-view image illustrated in FIG. 14C, that is, an analysis result indicating, for example, that faces of three persons are represented in the live-view image. In FIG. 14A and FIG. 14B, images in which "LV" is indicated are live-view images, and "LV" may or may not be actually displayed (the same applies to FIG. to FIG. 23 described below). A display that enables distinction from a live-view image (for example, when "photographed image" is displayed) may be performed in a frame image for which a photographing instruction was issued (in FIG. 14B, an upper-left frame image), without displaying "LV" (the same applies to FIG. 15 to FIG. 23 described below).

Figure 15A:
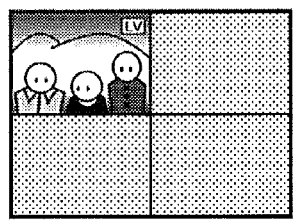
FIG. 15A is another first diagram explaining an image collage displayed on a display panel in accordance with a scenario set in a camera according to the embodiment of the present invention.
Figure 15B:
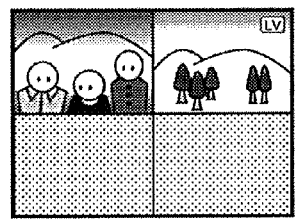
FIG. 15B is another second diagram explaining an image collage displayed on a display panel in accordance with a scenario set in a camera according to the embodiment of the present invention.
Figure 15C:
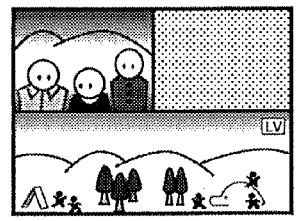
FIG. 15C is another third diagram explaining an image collage displayed on a display panel in accordance with a scenario set in a camera according to the embodiment of the present invention.

As another example, when a live-view image is arranged and displayed in an upper-left display region, as illustrated in FIG. 15A, and when a photographing instruction is issued, a frame image (a photographed image obtained in reply to the photographing instruction above) is first arranged in the upper-left display region, and a live-view image is arranged and displayed in an upper-right display region, as illustrated in FIG. 15B. The live-view image is then arranged and displayed in a lower display region formed by integrating lower-left and lower-right display regions into one region, as illustrated in FIG. 15C. This display is performed according to a scenario generated on the basis of an analysis result of the live-view image, that is, an analysis result indicating, for example, that a landscape is represented in the live-view image. In the display illustrated in FIG. 15C, the upper-left and upper-right display regions and the lower display region may be arranged and displayed so as to be replaced with each other.

As described above, when the subject detector 109d judges an image to include a distant-view landscape as a main subject or an image to include a moving body moving in a horizontal direction, compositions as illustrated in FIG. 15A to FIG. 15C are employed.

Figure 15D:
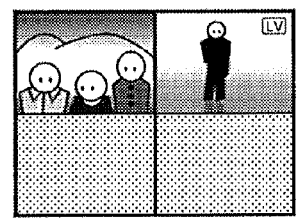
FIG. 15D is another fourth diagram explaining an image collage displayed on a display panel in accordance with a scenario set in a camera according to the embodiment of the present invention.
Figure 15E:
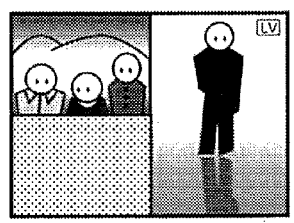
FIG. 15E is another fifth diagram explaining an image collage displayed on a display panel in accordance with a scenario set in a camera according to the embodiment of the present invention.

As another example, when the display illustrated in FIG. 15A is performed and when a photographing instruction is issued, a frame image is first arranged in an upper-left display region, and a live-view image is arranged and displayed in an upper-right display region, as illustrated in FIG. 15D. The live-view image is then arranged and displayed in a right-side display region formed by integrating the upper-right and lower-right display regions into one region, as illustrated in FIG. 15E. This display is performed according to a scenario generated on the basis of an analysis result of the live-view image, that is, an analysis result indicating, for example, that the entire body of a person is represented in the live-view image. In the display illustrated in FIG. 15E, the upper-left and lower-left display regions and the right-side display region may be arranged and displayed so as to be replaced with each other.

Figure 15F:
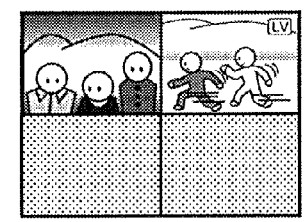
FIG. 15F is another sixth diagram explaining an image collage displayed on a display panel in accordance with a scenario set in a camera according to the embodiment of the present invention.
Figure 15G:
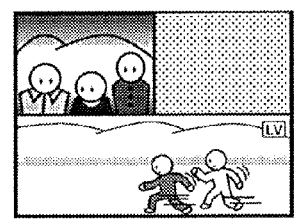
FIG. 15G is another seventh diagram explaining an image collage displayed on a display panel in accordance with a scenario set in a camera according to the embodiment of the present invention.
Figure 15H:
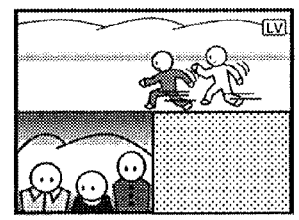
FIG. 15H is another eighth diagram explaining an image collage displayed on a display panel in accordance with a scenario set in a camera according to the embodiment of the present invention.

As another example, when the display illustrated in FIG. 15A is performed and when a photographing instruction is issued, a frame image is first arranged in an upper-left display region, and a live-view image is arranged and displayed in an upper-right display region, as illustrated in FIG. 15F. The live-view image is then arranged and displayed in a lower display region formed by integrating lower-left and lower-right display regions into one display region, as illustrated in FIG. 15G. This display is performed according to a scenario generated on the basis of an analysis result of the live-view image, that is, an analysis result indicating, for example, that a person moving from a right side to a left side is represented in the live-view image. In the display illustrated in FIG. 15G, the upper-left and the upper-right display regions and the lower display region may be replaced with each other, and may be displayed as illustrated in FIG. 15H.

As another example, when a live-view image is arranged and displayed in an upper-left display region, as illustrated in FIG. 16A, and when persons represented in the live-view image have a smile and laugh loudly, as illustrated in FIG. 16B, moving image recording is started, as illustrated in FIG. 16C. "MOVIE" illustrated in FIG. 16C indicates a state in which a moving image is being recorded. This display is performed according to a scenario generated on the basis of an analysis result of the live-view image, that is, an analysis result indicating, for example, that persons that have a smile and laugh loudly are represented in the live-view image. Voice can be determined from voice information input from the MIC 141 and the audio unit 137.

As another example, when the display illustrated in FIG. 16A is performed and when a photographing instruction is issued, a frame image (a photographed image obtained in reply to the photographing instruction above) is arranged in an upper-left display region, and faces of persons represented in a live-view image are respectively arranged and displayed in the other display regions, as illustrated in FIG. 16D (similarly to the display illustrated in FIG. 14B). When the person who is represented in the live-view image and who is displayed in a lower-right display region has a smile and laughs loudly, special image processing (for example, soft focus processing that corresponds to Fantastic Focus) is performed on the live-view image displayed in the lower-right display region, and the processed live-view image is displayed, as illustrated in FIG. 16E. Alternatively, the lower-right display region is enlarged, and a similar display is performed, as illustrated in FIG. 16F. This display is performed according to a scenario generated on the basis of an analysis result of the live-view image, that is, an analysis result indicating, for example, that faces of three persons including the person that has a smile and laughs loudly are represented in the live-view image.

Thus, as a result of judgment of voice detected by the audio unit 137, compositions illustrated in FIG. 16B to FIG. 16E are generated. Alternatively, the subject detector 109d may analyze a person's facial expression, and may determine a composition in accordance with the expression.

Figure 17A:
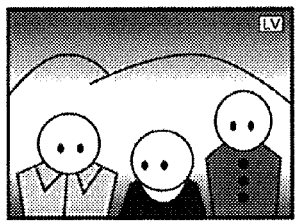
FIG. 17A is yet another first diagram explaining an image collage displayed on a display panel in accordance with a scenario set in a camera according to the embodiment of the present invention.
Figure 17B:
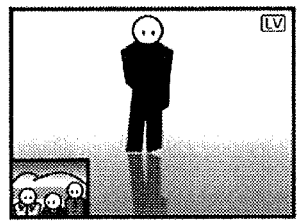
FIG. 17B is yet another second diagram explaining an image collage displayed on a display panel in accordance with a scenario set in a camera according to the embodiment of the present invention.
Figure 17C:
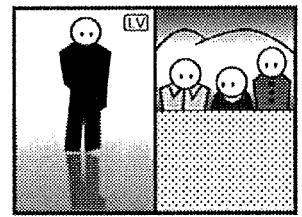
FIG. 17C is yet another third diagram explaining an image collage displayed on a display panel in accordance with a scenario set in a camera according to the embodiment of the present invention.

As another example, when a live-view image is displayed on the display panel 135 in the one-frame form, as illustrated in FIG. 17A, and when a photographing instruction is issued, a frame image (a photographed image obtained in reply to the photographing instruction above) is first arranged in a small lower-left display region, and a live-view image is arranged and displayed in the remaining display region, as illustrated in FIG. 17B. The frame image is then arranged in an upper-right display region, and the live-view image is arranged and displayed in a left-side display region, as illustrated in FIG. 17C. This display is performed according to a scenario generated on the basis of an analysis result of the live-view image, that is, an analysis result indicating, for example, that the entire body of a person is represented in the live-view image.

As described above, when the subject detector 109d judges an image to include a main subject in a longitudinal direction, e.g., a person or a building structure such as a building, compositions as illustrated in FIG. 17A to FIG. 17C are employed.

As another example, when a live-view image is arranged and displayed in an upper-left display region, as illustrated in FIG. 18A, and when a photographing instruction is issued, a frame image (a photographed image obtained in reply to the photographing instruction above) is arranged in an upper-left display region, and a live-view image is arranged and displayed in an upper-right display region, as illustrated in FIG. 18B. In this case, when a touch operation for tracing a boundary between the upper-right display region in which the live-view image is displayed and a lower-right display region in which no images are displayed (the region expansion operation) is performed, as illustrated in FIG. 18C, the live-view image is arranged and displayed in a right-side display region formed by integrating the upper-right and lower-right display regions into one region, as illustrated in FIG. 18D. This display is performed according to a scenario generated on the basis of the region expansion operation of a user.

As another example, when the display illustrated in FIG. 18A is performed and when a photographing instruction is issued, a frame image is arranged in an upper-left display region, and a live-view image is arranged and displayed in a lower-left display region, as illustrated in FIG. 18E. In this case, when a touch operation for tracing a boundary between the lower-left display region in which the live-view image is displayed and a lower-right display region in which no images are displayed (the region expansion operation) is performed, as illustrated in FIG. 18F, the live-view image is arranged and displayed in a lower display region formed by integrating the lower-left and lower-right display regions into one region, as illustrated in FIG. 18G. This display is also performed according to a scenario generated on the basis of the region expansion operation of a user.

Figure 19A:
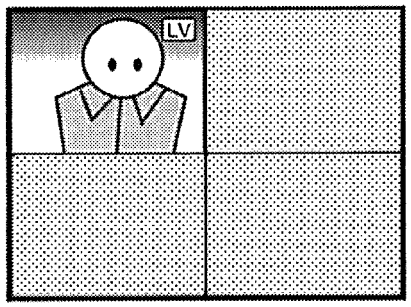
FIG. 19A is yet another first diagram explaining an image collage displayed on a display panel in accordance with a scenario set in a camera according to the embodiment of the present invention.
Figure 19B:
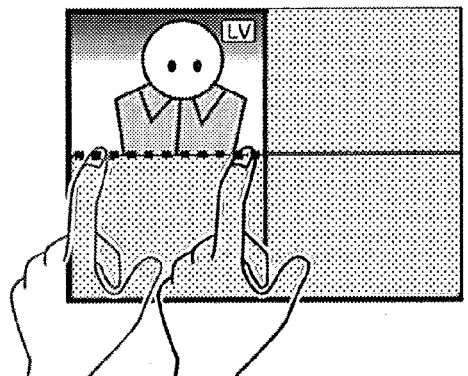
FIG. 19B is yet another second diagram explaining an image collage displayed on a display panel in accordance with a scenario set in a camera according to the embodiment of the present invention.
Figure 19C:
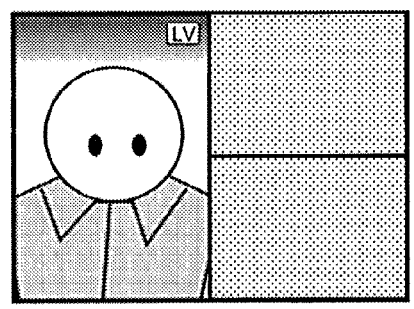
FIG. 19C is yet another third diagram explaining an image collage displayed on a display panel in accordance with a scenario set in a camera according to the embodiment of the present invention.
Figure 19D:
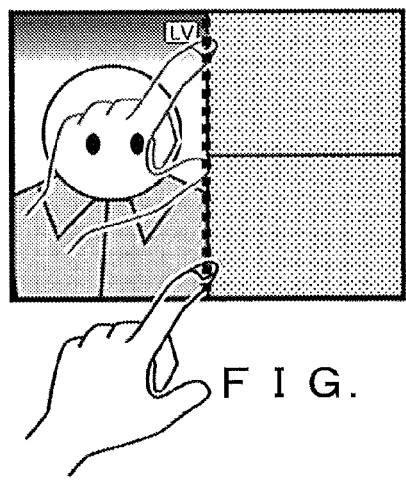
FIG. 19D is yet another fourth diagram explaining an image collage displayed on a display panel in accordance with a scenario set in a camera according to the embodiment of the present invention.
Figure 19E:
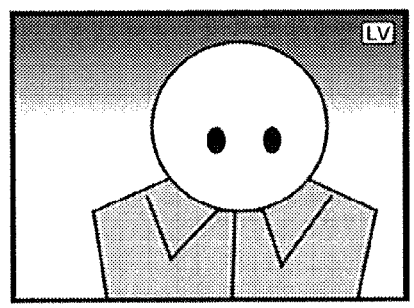
FIG. 19E is yet another fifth diagram explaining an image collage displayed on a display panel in accordance with a scenario set in a camera according to the embodiment of the present invention.

As another example, When a live-view image is arranged and displayed in an upper-left display region, as illustrated in FIG. 19A, and when a touch operation for tracing a boundary between the upper-left display region in which the live-view image is displayed and a lower-left display region in which no images are displayed (the region expansion operation) is performed, as illustrated in FIG. 19B, the live-view image is arranged and displayed in a left-side display region formed by integrating the upper-left and lower-left display regions into one region, as illustrated in FIG. 19C. When a touch operation for tracing a boundary between the left-side display region in which the live-view image is displayed and a right-side display region (upper-right and lower-right display regions) in which no images are displayed (the region expansion operation) is further performed, as illustrated in FIG. 19D, the live-view image is arranged and displayed in a display region formed by integrating the left-side and right-side display regions into one region, as illustrated in FIG. 19E. This display is also performed according to a scenario generated on the basis of the region expansion operation of a user.

As described above, when the subject detector 109d judges a ratio of a main subject in an angle of view, image magnification (namely, the subject detector 109d judges an image that is photographed in close-up on the basis of a result of a calculation using a focal distance and a distance to a subject), compositions as illustrated in FIG. 19A to FIG. 19E are employed.

However, as an example, assume that when a live-view image is arranged and displayed in an upper-left display region, as illustrated in FIG. 20A, a photographing instruction is issued, and that when a frame image (a photographed image obtained in reply to the photographing instruction above) is arranged in an upper-left display region and a live-view image is arranged and displayed in an upper-right display region, as illustrated in FIG. 20B, a touch operation for tracing a boundary between the upper-left display region in which the frame image is displayed and the upper-right display region in which the live-view image is displayed is performed, as illustrated in FIG. 20C. In this case, region expansion as illustrated in FIG. 19D is not performed. This is because one of the images adjacent to the boundary at which the touch operation was performed, namely, the frame image displayed in the upper-left display region, has been determined to be an image to be used for the combination of an image collage. In this case, region expansion is not performed. The touch operation above does not fall under a touch operation for tracing a boundary between a display region in which a live-view image is displayed and a display region in which no images are displayed, and therefore the touch operation above is not the region expansion operation in the first place.

Figure 21A:
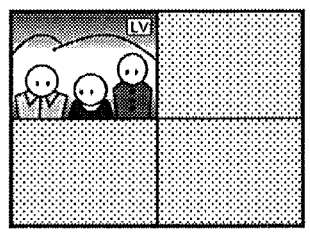
FIG. 21A is yet another first diagram explaining an image collage displayed on a display panel in accordance with a scenario set in a camera according to the embodiment of the present invention.
Figure 21B:
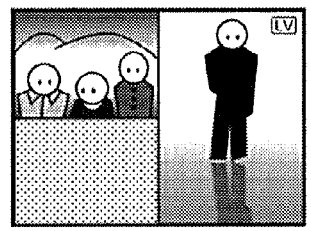
FIG. 21B is yet another second diagram explaining an image collage displayed on a display panel in accordance with a scenario set in a camera according to the embodiment of the present invention.
Figure 21C:
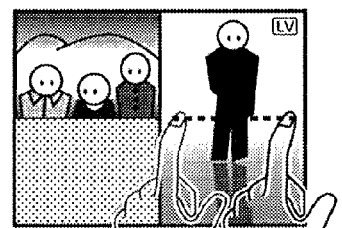
FIG. 21C is yet another third diagram explaining an image collage displayed on a display panel in accordance with a scenario set in a camera according to the embodiment of the present invention.
Figure 21D:
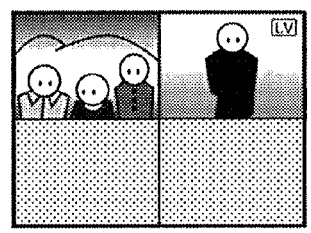
FIG. 21D is yet another fourth diagram explaining an image collage displayed on a display panel in accordance with a scenario set in a camera according to the embodiment of the present invention.
Figure 21E:
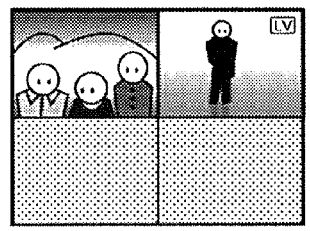
FIG. 21E is yet another fifth diagram explaining an image collage displayed on a display panel in accordance with a scenario set in a camera according to the embodiment of the present invention.

As another example, when a live-view image is arranged and displayed in an upper-left display region, as illustrated in FIG. 21A, and when a photographing instruction is issued, a frame image (a photographed image obtained in reply to the photographing instruction above) is arranged in an upper-left display region and a live-view image is arranged and displayed in a right-side display region formed by integrating upper-right and lower-right display regions into one region, as illustrated in FIG. 21B. In this case, when a touch operation for tracing two points on an outer periphery of the right-side display region in which the live-view image is displayed from one point to the other point (the region division operation) is performed, as illustrated in FIG. 21C, the right-side display region is divided into the upper-right display region and the lower-right display region, and the live-view image is arranged and displayed in one of the display regions (in this example, the upper-right display region), as illustrated in FIG. 21D or FIG. 21E. In the display example illustrated in FIG. 21E, the live-view image is reduced and displayed such that a subject represented in the live-view image (the entire body of a person) fits within the upper-right display region. This display is performed according to a scenario generated on the basis of the region division operation of a user and an analysis result of the live-view image.

In the camera 11, the scenario changing instruction is issued by performing the photographed frame changing operation, the region expansion operation, or the region division operation, but the scenario changing instruction may be issued by performing another operation. As an example, when a live-view image is arranged and displayed in an upper-left display region, as illustrated in FIG. 22A, and when a zoom operation to a telephoto side (a long focal distance side) is performed, a live-view image in which a subject is expanded in reply to the zoom operation is displayed, as illustrated in FIG. 22B and FIG. 22C. When the zoom operation to the telephoto side is further performed, a live-view image in which the subject is further expanded in reply to the zoom operation is displayed, as illustrated in FIG. 22D. In this case, the live-view image is arranged and displayed in a left-side display region formed by integrating upper-left and lower-left display regions into one region such that a portion of a face represented in the live-view image is not missing. When the zoom operation to the telephoto side is further performed, a live-view image in which the subject is further expanded in reply to the zoom operation is displayed, as illustrated in FIG. 22E. In this case, the live-view image is arranged and displayed in a display region formed by integrating the left-side, upper-right, and lower-right display regions into one region such that a portion of the face represented in the live-view image is not missing. This display is performed according to a scenario generated on the basis of the zoom operation to the telephoto side performed by a user.

Figure 23A:
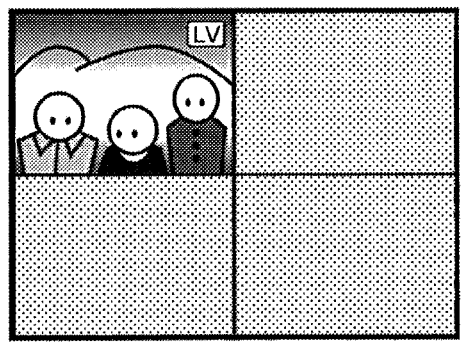
FIG. 23A is yet another first diagram explaining an image collage displayed on a display panel in accordance with a scenario set in a camera according to the embodiment of the present invention.
Figure 23B:
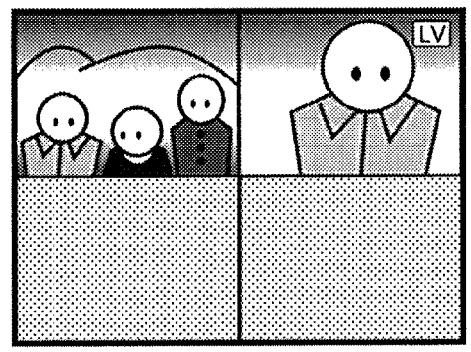
FIG. 23B is yet another second diagram explaining an image collage displayed on a display panel in accordance with a scenario set in a camera according to the embodiment of the present invention.
Figure 23C:
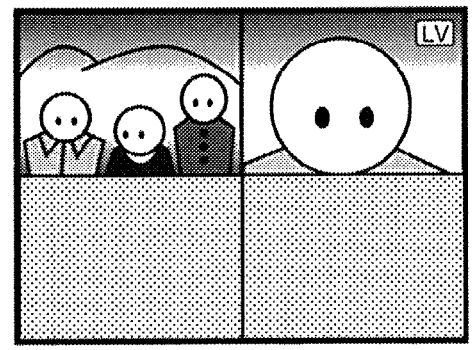
FIG. 23C is yet another third diagram explaining an image collage displayed on a display panel in accordance with a scenario set in a camera according to the embodiment of the present invention.
Figure 23E:
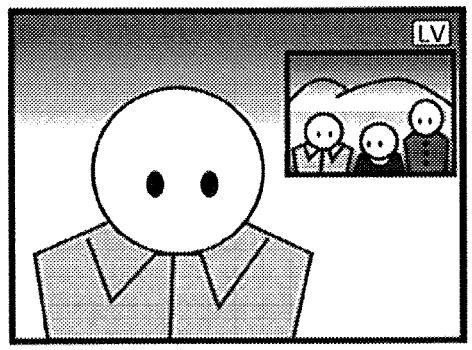
FIG. 23E is yet another fifth diagram explaining an image collage displayed on a display panel in accordance with a scenario set in a camera according to the embodiment of the present invention.
Figure 23D:
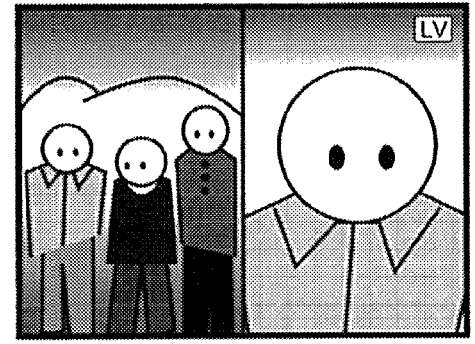
FIG. 23D is yet another fourth diagram explaining an image collage displayed on a display panel in accordance with a scenario set in a camera according to the embodiment of the present invention.

As another example, when a live-view image is arranged and displayed in an upper-left display region, as illustrated in FIG. 23A, and when a photographing instruction is issued, a frame image (a photographed image obtained in reply to the photographing instruction above) is arranged in an upper-left display region and a live-view image is arranged and displayed in an upper-right display region, as illustrated in FIG. 23B. In this case, when the zoom operation to the telephoto side is performed, a live-view image in which a subject is further expanded in reply to the zoom operation is displayed, as illustrated in FIG. 23C. When the zoom operation to the telephoto side is further performed, a live-view image in which the subject is further expanded in reply to the zoom operation is displayed, as illustrated in FIG. 23D. In this case, the live-view image is arranged in a right-side display region formed by integrating upper-right and lower-right display regions into one region such that a portion of a face represented in the live-view image is not missing, and accordingly the frame image displayed in the upper-left display region is arranged and displayed in a left-side display region formed by integrating upper-left and lower-left display regions. Alternatively, the frame image displayed in the upper-left display region is arranged in another small display region and a live-view image in which the subject is further expanded in reply to the zoom operation is arranged and displayed in the remaining display region such that a portion of a face represented in the live-view image is not missing, as illustrated in FIG. 23E. This display is also performed according to the scenario generated on the basis of the zoom operation to the telephoto side performed by a user.

In addition, detecting a characteristic color of a main subject in a live-view image and extracting or cutting out an image using a color that is similar or related to the detected color is considered. As an example, in a case in which a person, which is a main subject, is dressed in a red sweater, a color scheme is judged to have many red portions, and a subject related to "red", such as the sunset, an apple, a post box, a traffic signal, a sign, a signboard, a vehicle, or a kendama (toy), in a field is cut out so as to generate a photo collage. A photo collage can also be generated by retrieving images photographed in the past with color information. Judgment using color can be performed with respect to a tone (a color tone, lightness, shade, or a balance in the chroma direction) in addition to a single color, and a colorful photo collage or a photo collage of a dark color can be generated.

As described above, the camera 11 according to the embodiment not only enables a user to manually set a scenario for an image collage but also enables the camera 11 to automatically set an optimum scenario on the basis of an analysis result of a live-view image. In both of these cases, a user can freely change the set scenario by issuing a scenario changing instruction. Because an image collage is generated on the basis of the set scenario, the camera 11 according to the embodiment can support the easy generation of image data of a desired image collage for an arbitrary subject with a simple operation.

The description above has been given by using a digital camera as an imaging device, but the technology above can be applied to a mobile phone with a camera (a smartphone), tablet equipment, or other portable equipment, in addition to equipment dedicated to a camera. Further, the embodiments above give specific examples of the present invention in order to easily understand the invention, and the present invention is not limited to the embodiments above. Various modifications or variations of the imaging device according to the present invention can be made without departing from the spirit of the present invention specified in the claims.

According to the present invention, a technology for supporting the easy generation of image data of a desired image collage for an arbitrary subject with a simple operation can be provided.

What is claimed is:

1. An imaging device that combines plural pieces of image data so as to generate image collage data, the imaging device comprising:
   an imaging unit that images a subject so as to repeatedly obtain first image data;
   an image processing unit that performs image processing on the first image data so as to obtain second image data;
   a first storage unit in which the first image data and the second image data are stored;
   an image analysis detector that analyzes a feature of the first or second image data stored in the first storage unit and that outputs an analysis result that includes information on the subject and a composition;
a scenario generation processor that generates scenario data on the basis of an analysis result of the image analysis detector;
a scenario changing processor that performs setting so as to change the scenario data generated by the scenario generation processor; and
an image collage processing unit that determines arrangement of images on the basis of the scenario data and that combines a plurality of pieces of first or second image data stored in the first image storage unit that has undergone color conversion processing or luminance conversion processing, so as to generate one piece of image collage data placed at a prescribed position in accordance with the determined arrangement of images, wherein
after the scenario generation processor has generated the scenario data on the basis of the analysis result of the image analysis detector, when the scenario changing processor performs setting so as to change the scenario data, the scenario data is prioritized, and when the scenario changing processor does not perform setting so as to change the scenario data, the scenario data is updated on the basis of the analysis result of the image analysis detector, in synchronization with a change in the image data stored in the first storage unit.

2. The imaging device according to claim 1, wherein the scenario data includes the number of divisions and a division form of an image collage, and arrangement information of images to be combined.

3. The imaging device according to claim 1, wherein the image data for which the feature is analyzed by the image analysis detector is image data of a live-view image.

4. The imaging device according to claim 1, wherein the plural pieces of image data combined by the image collage processing unit include image data of a live-view image.

5. The imaging device according to claim 1, further comprising:
a display unit that displays image data,
wherein the display unit displays the image collage data generated by the image collage processing unit.

6. The imaging device according to claim 1, further comprising:
a second storage unit in which image data is stored,
wherein the image collage data generated by the image collage processing unit is stored in the second storage unit.

7. The imaging device according to claim 1, further comprising:
a reception unit that receives a scenario changing instruction,
wherein the scenario generation processor generates the scenario data on the basis of the scenario changing instruction received by the reception unit and the analysis result of the image analysis detector.

8. The imaging device according to claim 7, wherein a feature of the analysis result of the image analysis detector is the number of main subjects, that the main subject is a landscape, that the main subject is vertically long, that the main subject is a moving body, that the main subject is a person.

9. An image processing method comprising:
imaging a subject so as to repeatedly obtain first image data;
storing the first image data in a first storage unit;
performing image processing on the first image data so as to obtain second image data;
storing the second image data in the first storage unit;
analyzing a feature of the first or second image data stored in the first storage unit and outputting an analysis result that includes information on the subject and a composition;
generating scenario data on the basis of a result of the analyzing;
after the scenario data has been generated on the basis of the result of the analyzing, when setting is performed so as to change the scenario data, prioritizing the scenario data, and when setting is not performed so as to change the scenario data, updating the scenario data on the basis of the result of the analyzing, in synchronization with a change in the image data stored in the first storage unit; and
determining an arrangement of images on the basis of the scenario data and combining plural pieces of first or second image data image data stored in the first storage unit that has undergone color conversion processing or luminance conversion processing, so as to generate one piece of image collage data placed at a prescribed position in accordance with the determined arrangement of images.

10. A non-transitory computer-readable recording medium storing an image processing program for causing a computer to execute a process comprising:
imaging a subject so as to repeatedly obtain first image data;
storing the first image data in a first storage unit;
performing image processing on the first image data so as to obtain second image data;
storing the second image data in the first storage unit;
analyzing a feature of the first or second image data stored in the first storage unit and outputting an analysis result that includes information on the subject and a composition;
generating scenario data on the basis of a result of the analyzing;
after the scenario data has been generated on the basis of the result of the analyzing, when setting is performed so as to change the scenario data, prioritizing the scenario data, and when setting is not performed so as to change the scenario data, updating the scenario data on the basis of the result of the analyzing, in synchronization with a change in the image data stored in the first storage unit; and
determining an arrangement of images on the basis of the scenario data and combining plural pieces of first or second image data image data stored in the first storage unit that has undergone color conversion processing or luminance conversion processing, so as to generate one piece of image collage data placed at a prescribed position in accordance with the determined arrangement of images.

* * * * *